(12) United States Patent
Inoue

(10) Patent No.: US 7,826,152 B2
(45) Date of Patent: Nov. 2, 2010

(54) COMPOSITE OPTICAL DEVICE

(75) Inventor: Kenji Inoue, Hyogo (JP)

(73) Assignee: Panasonic Corporation, Osaka (JP)

( * ) Notice: Subject to any disclaimer, the term of this patent is extended or adjusted under 35 U.S.C. 154(b) by 64 days.

(21) Appl. No.: 12/294,345

(22) PCT Filed: Mar. 2, 2007

(86) PCT No.: PCT/JP2007/054045

§ 371 (c)(1),
(2), (4) Date: Sep. 24, 2008

(87) PCT Pub. No.: WO2007/111077

PCT Pub. Date: Oct. 4, 2007

(65) Prior Publication Data

US 2009/0168205 A1    Jul. 2, 2009

(30) Foreign Application Priority Data

Mar. 24, 2006   (JP) ............................. 2006-083750
Mar. 24, 2006   (JP) ............................. 2006-083758

(51) Int. Cl.
*G02B 9/00* (2006.01)
*G02B 3/02* (2006.01)

(52) U.S. Cl. ................. 359/796; 359/718; 359/719; 359/721; 359/722; 359/724; 359/736; 359/741; 359/742; 359/743

(58) Field of Classification Search ............... 359/718, 359/719, 721, 722, 724, 736, 741–743, 796
See application file for complete search history.

(56) References Cited

U.S. PATENT DOCUMENTS

| 5,949,577 | A | * | 9/1999 | Ogata ........................ 359/565 |
| 6,288,846 | B1 | * | 9/2001 | Stoner, Jr. .................. 359/743 |
| 6,614,600 | B2 | * | 9/2003 | Kojima ...................... 359/719 |
| 6,687,209 | B2 |   | 2/2004 | Ota et al. |
| 6,781,771 | B2 | * | 8/2004 | Kitahara et al. ............ 359/719 |
| 6,791,764 | B2 | * | 9/2004 | Hosoe ........................ 359/719 |

FOREIGN PATENT DOCUMENTS

| JP | 03-295830 | 12/1991 |
| JP | 2001-249208 | 9/2001 |
| JP | 2002-062416 | 2/2002 |
| JP | 2002-182022 | 5/2002 |
| JP | 2002-182022 | 6/2002 |
| JP | 2005-305875 | 11/2005 |

* cited by examiner

*Primary Examiner*—Evelyn A. Lester
(74) *Attorney, Agent, or Firm*—McDermott Will & Emery LLP

(57) ABSTRACT

A composite optical device 1 includes a first optical section 10 having an optical functional surface 11 and a second optical section 20 bonded to the first optical section 10 on the optical functional surface 11. The optical functional surface 11 includes a smooth part 13 and a concave-convex part 12 adjacent to each other, and is constructed so that a position P2, along a normal direction of the smooth part 13, of a concave bottom of the concave-convex part 12 can be closer to the center of the first optical section 10 than a position P1 along the normal direction of an end of the smooth part 13 on a side of the concave-convex part 12 in a boundary vicinity portion NR between the smooth part 13 and the concave-convex part 12.

11 Claims, 16 Drawing Sheets

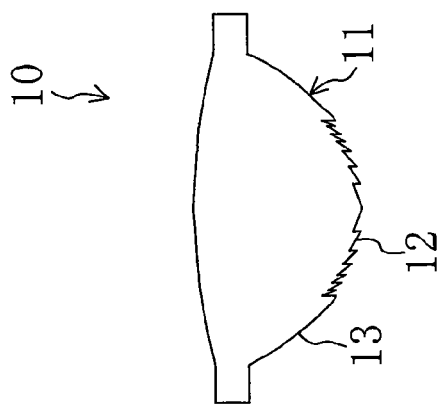
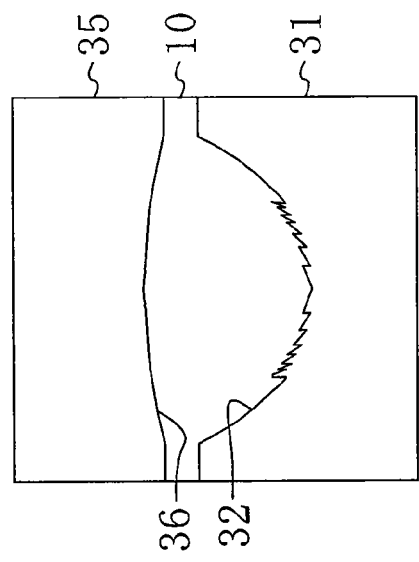
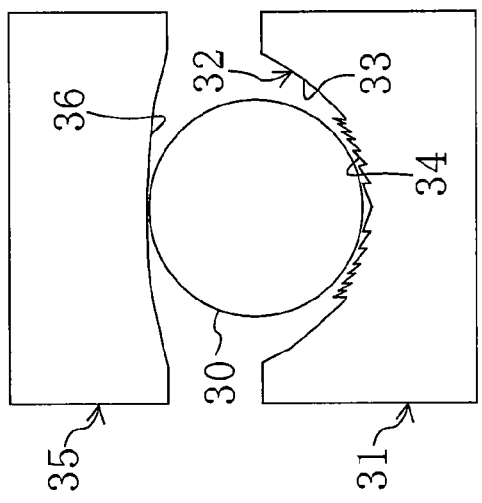
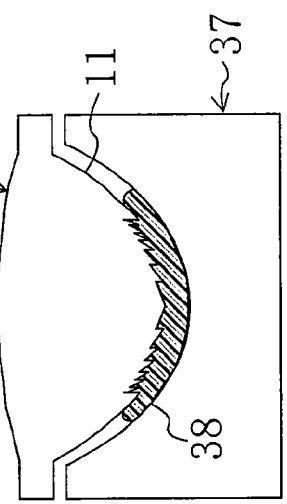
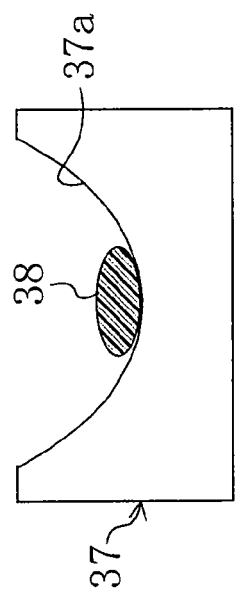

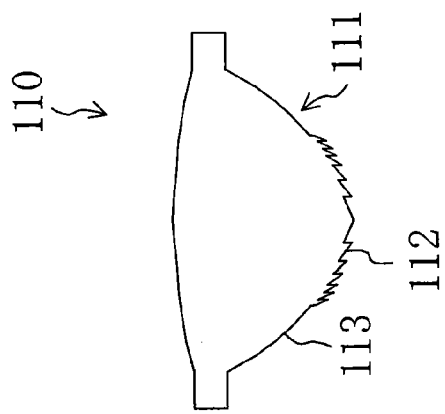
FIG.15C
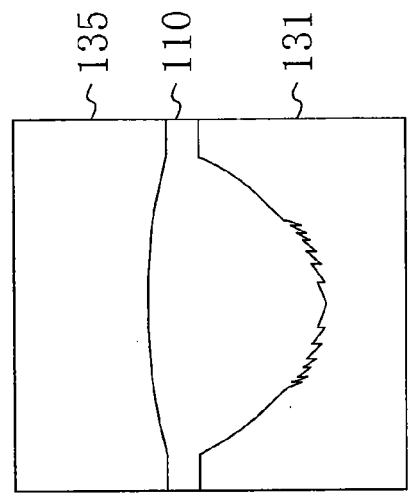
FIG.15B
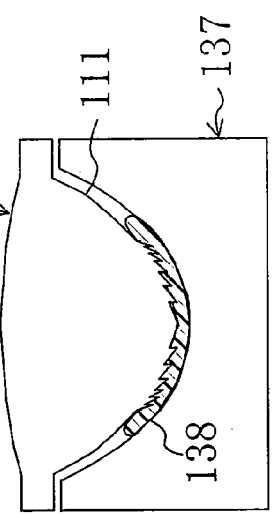
FIG.15E
FIG.15A
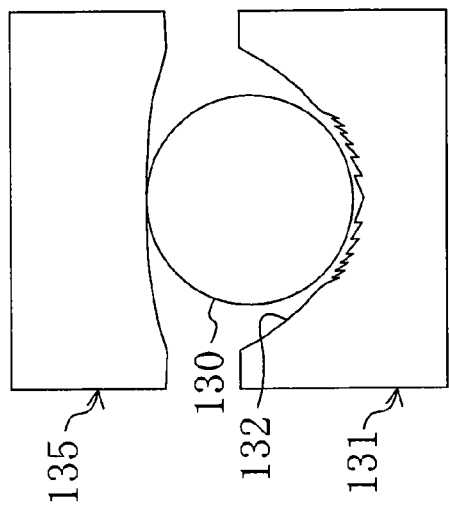
FIG.15D
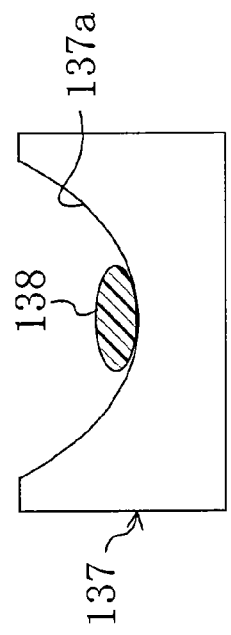

ial sections is difficult to fabricate, and hence, it is disadvantageously difficult to obtain a composite optical device with high form accuracy.

COMPOSITE OPTICAL DEVICE

RELATED APPLICATIONS

This application is the US National Phase under 35 U.S.C. §371 of International Application No. PCT/JP2007/054045, filed on Mar. 2, 2007, which claims the benefit of Japanese Application Nos. JP 2006-083750 filed on Mar. 24, 2006 and JP 2006-083758 filed on Mar. 24, 2006, the disclosures of which Applications are incorporated by reference herein.

TECHNICAL FIELD

The present invention relates to a composite optical device.

BACKGROUND ART

A composite optical device including two optical sections bonded to each other and a relief pattern (a diffraction surface) formed on the interface between the two optical sections is conventionally known (see, for example, Patent Document 1). This composite optical device can reduce the dependency on a wavelength of the diffraction surface, and is regarded useful as a device for obtaining high diffraction efficiency in light of a wavelength different from the blaze wavelength particularly for an optical system using light of plural kinds of wavelength bands such as a camera optical system.

Patent Document 1: Japanese Laid-Open Patent Publication No. 2001-249208

DISCLOSURE OF THE INVENTION

Problems to be Solved by the Invention

In an objective optical system of an optical pickup or the like compatible with a plurality of kinds of optical disks, an optical device (such as a phase correcting device or an objective lens) in which a plurality of optical functional sections having different optical functions (for example, different optical power or different light reflecting characteristics) are formed in its optical effective part may be used. For example, an optical pickup capable of reading a CD (compact disk), a DVD (digital versatile disk) and a BD (Blu-ray disk (registered trademark)) may use an objective lens equipped with a lens surface including an optical functional section having NA of 0.6 through 0.85 for collecting light of approximately 405 nm for a BD onto an information recording surface of an optical disk, an optical functional section with NA of 0.47 through 0.6 for respectively collecting light of approximately 405 nm for a BD and light of approximately 655 nm for a DVD onto information recording surfaces of respective optical disks, and an optical functional section with NA of 0.47 or less for respectively collecting light of approximately 405 nm for a BD, a light of approximately 655 nm for a DVD and light of approximately 785 nm for a CD onto information recording surfaces of respective optical disks.

In order to obtain such an optical device including a plurality of optical functional sections having different optical functions, for example, a diffraction surface may be formed in merely a part of the optical effective part. Furthermore, another optical device may be bonded to the optical effective part in which a diffraction surface is formed for providing high diffraction efficiency in all light for a plurality of kinds of optical disks using different wavelengths as described above. However, such a composite optical device including the two optical sections bonded to each other and the diffraction surface formed in a part of the interface between the two It is noted that such a problem commonly arises when a concave-convex surface typified by a lens array surface or a phase step surface is formed on a part of an interface.

The present invention was devised to overcome such a problem, and an object of the invention is providing a composite optical device having a structure easily formed with high form accuracy.

Means for Solving the Problem

In order to achieve the object, the composite optical device of this invention includes a first optical section having an optical functional surface; and a second optical section bonded to the first optical section on the optical functional surface, and the optical functional surface includes a smooth part and a concave-convex part adjacent to each other, and the optical functional surface is constructed in such a manner that a position, along a normal direction of the smooth part, of a concave bottom of the concave-convex part is closer to a center of the first optical section than a position along the normal direction of an end of the smooth part on a side of the concave-convex part in the vicinity of a boundary between the smooth part and the concave-convex part.

Alternatively, the composite optical device of this invention includes a first optical section having an optical functional surface; and a second optical section bonded to the first optical section on the optical functional surface, and the optical functional surface includes a smooth part and a concave-convex part adjacent to each other, and the optical functional surface is constructed in such a manner that a position, along a normal direction of the smooth part, of a convex apex of the smooth part is farther from a center of the first optical section than a position along the normal direction of an end of the smooth part on a side of the concave-convex part in the vicinity of a boundary between the smooth part and the concave-convex part.

It is noted that a "smooth part" herein means a smooth surface having neither a step nor a ridge. On the contrary, a "concave-convex part" herein means a surface including a plurality of concaves and convexes arranged periodically or aperiodically. It is noted that a boundary between a concave and a convex should not be a ridge but may be in a rounded shape such as a beveled shape.

Effect of the Invention

According to the present invention, a composite optical device having a structure easily formed with high form accuracy can be realized.

BRIEF DESCRIPTION OF DRAWINGS

FIG. 3 shows cross-sectional views for explaining a method for fabricating the composite optical device 1.

FIG. 15 shows cross-sectional views for explaining a method for fabricating the composite optical device 101.

Figure 1:
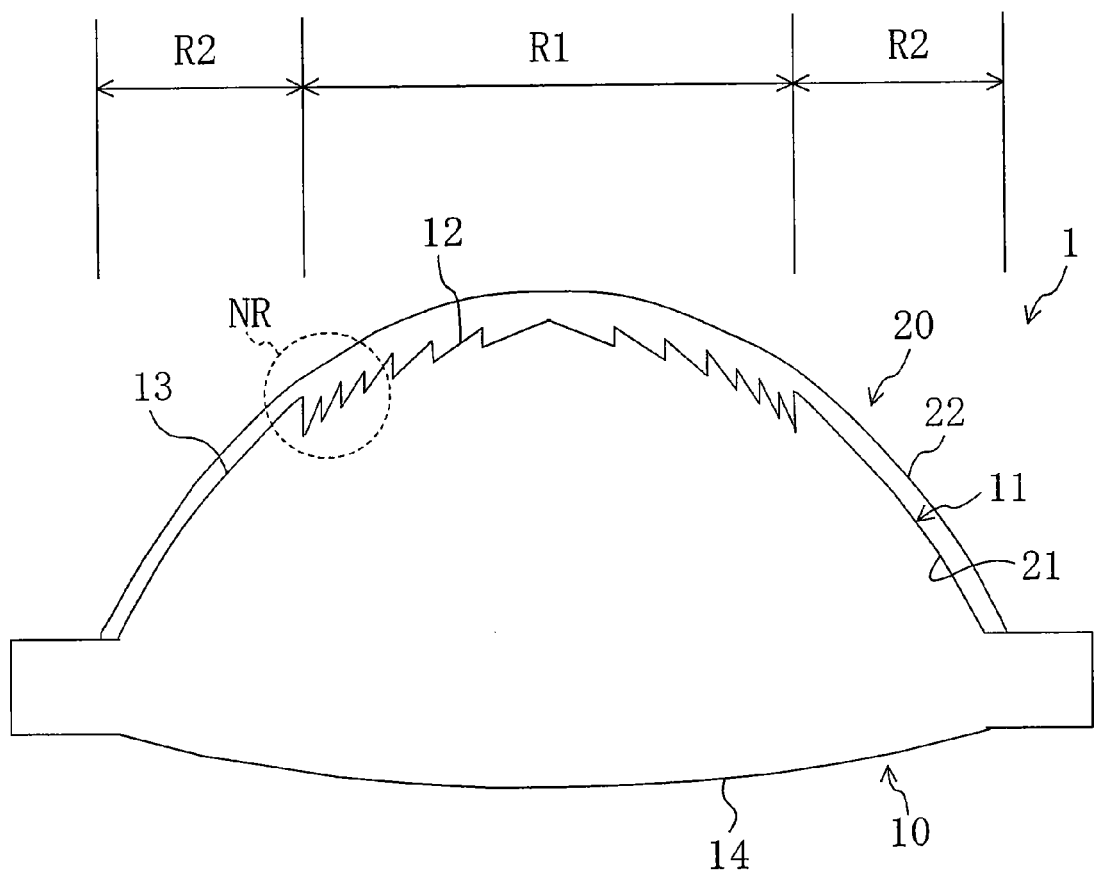
FIG. 1 is a cross-sectional view of a composite optical device 1 according to Embodiment 1.

DESCRIPTION OF REFERENCE NUMERALS 1, 2, 3, 4, 5, 6 composite optical device
10, 50 first optical section
11, 14, 21, 22, 51, 54 optical functional surface
12, 52 concave-convex part
13 smooth part
20 second optical section
53 flat smooth part
101, 102, 103, 104, 105, 106 composite optical device
110, 150 first optical section
111, 114, 121, 122, 151, 154 optical functional surface
112, 152 concave-convex part
113 smooth part
120 second optical section
153 flat smooth part

BEST MODE FOR CARRYING OUT THE INVENTION

Preferred embodiments of the invention will now be described in detail with reference to the accompanying drawings.

Embodiment 1

Figure 2:
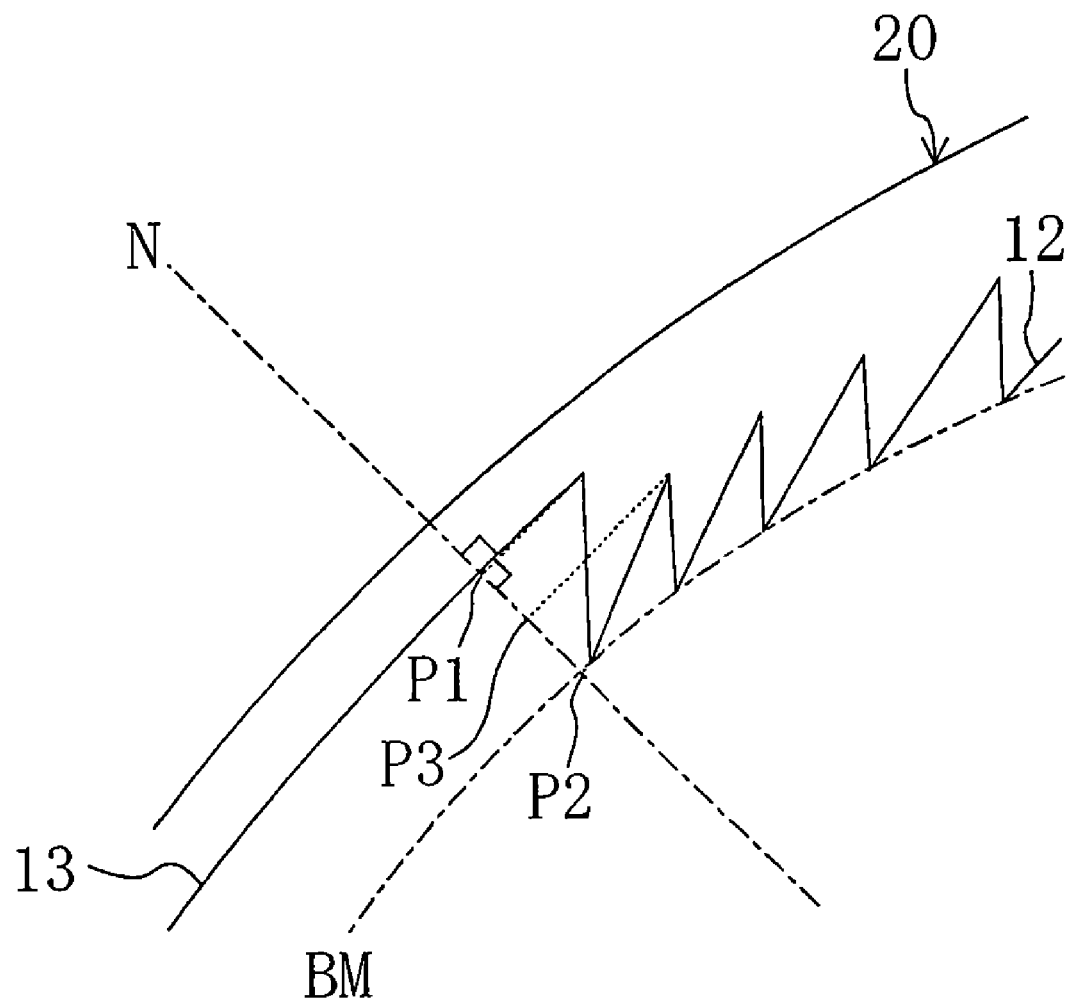
FIG. 2 is an enlarged cross-sectional view of a boundary vicinity portion NR of the composite optical device 1.

FIG. 1 is a cross-sectional view of a composite optical device 1 according to Embodiment 1. FIG. 2 is an enlarged cross-sectional view of a boundary vicinity portion NR of the composite optical device 1.

The composite optical device 1 of this Embodiment 1 includes a first optical section 10 and a second optical section 20. The first optical section 10 is composed of a biconvex lens having an optical functional surface (lens surface) 11 and an optical functional surface (lens surface) 14 both of which are convex aspheric surfaces. The optical functional surface 11 includes a concave-convex part 12 provided at the center and a smooth part 13 provided adjacent to the concave-convex part 12. Specifically, in Embodiment 1, the concave-convex part 12 is made of a diffraction surface having a saw-toothed cross-section. The second optical section 20 is composed of a meniscus lens bonded to the first optical section 10 on the optical functional surface 11. The second optical section 20 has, on a side of the first optical section 10, an optical functional surface 21 in the shape corresponding to the optical functional surface 11, and specifically, the optical functional surface 21 includes a diffraction surface provided at the center and a smooth surface adjacent to the diffraction surface. On the other hand, an optical functional surface 22 opposing the optical functional surface 21 is wholly made of a smooth surface.

In Embodiment 1, since the optical functional surface 11 includes the concave-convex part 12 and the smooth part 13 as described above, optical power of the optical functional surface 11 obtained in a center region R1 (see FIG. 1) where the concave-convex part 12 is provided is made different from optical power of the optical functional surface 11 obtained in a peripheral region R2 where the smooth part 13 is provided. Accordingly, for example, light of a given wavelength can be collected by using the center region R1 as well as light of a different wavelength can be collected by using the peripheral region R2. Specifically, when this composite optical device 1 is used as an objective lens, for example, light of a wavelength of approximately 655 nm can be collected by the center region R1 of the composite optical device 1 onto an information recording surface of a DVD and light of a wavelength of approximately 405 nm can be collected by using the center region R1 and the peripheral region R2 onto an information recording surface of a BD. Thus, an optical pickup having compatibility with a plurality of kinds of information recording media (such as optical disks) can be realized. It is noted that the concave-convex part 12 may further include a plurality of diffraction surfaces with different optical power and that the center region R1 may include a plurality of regions with different optical power.

Furthermore, in the composite optical device 1 of Embodiment 1, the second optical section 20 is bonded onto the optical functional surface 11 having the concave-convex part 12 made of a diffraction surface. Therefore, the dependency on wavelength of the concave-convex part 12 can be reduced, so that high diffraction efficiency can be realized not only in light of the blaze wavelength but also in light of a wavelength different from the blaze wavelength.

In Embodiment 1, the optical functional surface 11 is constructed as shown in FIG. 2 so that a position P2, along the normal direction N of the smooth part 13, of a concave bottom of the concave-convex part 12 can be closer to the center of the first optical section 10 than a position P1 of an end of the smooth part 13 on a side of the concave-convex part 12 along the normal direction N in the boundary vicinity portion NR (see FIG. 1) between the smooth part 13 and the concave-convex part 12. In other words, the concave-convex part 12 is receded from (is thinner than) the smooth part 13. Therefore, the first optical section 10 can be easily fabricated with high form accuracy as described below. Accordingly, the composite optical device 1 can be easily fabricated with high form accuracy.

From the viewpoint of fabrication easiness, a distance along the normal direction N between a concave bottom and a convex apex of the concave-convex part 12 (i.e., a distance between positions P2 and P3) in the boundary vicinity portion NR is preferably not less than ⅕ as large as a distance along the normal direction N between the end of the smooth part 13 on the side of the concave-convex part 12 and the concave bottom (i.e., a distance between the positions P1 and P2). Also, in the boundary vicinity portion NR, a virtual aspheric surface BM including the concave bottoms of the concave-convex part 12 is preferably closer to the center of the first optical section 10 than the smooth part 13. Furthermore, in the boundary vicinity portion NR, the position P3 along the normal direction N of the convex apex of the concave-convex part 12 is preferably closer to the center of the first optical section 10 than the position P1, and the convex apexes of the concave-convex part 12 are more preferably closer to the center of the first optical section 10 than a virtual aspheric surface including the position P1 and having the same aspheric coefficient as the virtual aspheric surface BM.

Next, a method for fabricating the composite optical device 1 of Embodiment 1 will be described with reference to FIG. 3. It is noted that the fabrication method will be herein described by assuming that the composite optical device 1 includes the first optical section 10 substantially made of glass and the second optical section 20 substantially made of a thermosetting resin.

First, the first optical section 10 is fabricated. Specifically, the first optical section 10 is fabricated by using a pair of dies 31 and 35 shown in FIG. 3A. The lower die 31 is made of a column-shaped body having a die surface 32 on its top face. The die surface 32 is used for molding the optical functional surface 11, and includes a concave-convex die surface portion 34 for forming the concave-convex part 12 and a smooth die surface portion 33 for forming the smooth part 13. On the other hand, the upper die 35 is made of a column-shaped body having a die surface 36 opposing the lower die 31. The lower die 31 and the upper die 35 are used for thermally pressing (heat pressing) a glass preform 30 previously processed into a ball shape or a shape and a dimension substantially close to the first optical section 10. Specifically, the glass preform 30 is disposed between the lower die 31 and the upper die 35. Next, the glass preform 30 is softened by heating to a temperature close to its softening temperature, and the softened glass preform 30 is pressed between the die surface 32 of the lower die 31 and the die surface 36 of the upper die 35 by relatively moving the upper die 35 toward the lower die 31, resulting in obtaining the first optical section 10 (see FIG. 3B). Then, after the first optical section 10 is cooled to a predetermined temperature (of, for example, the glass transition temperature −150° C. or room temperature), the first optical section 10 is completed by releasing it from the lower die 31 and the upper die 35. FIG. 3C is a cross-sectional view of the thus obtained first optical section 10.

Next, as shown in FIG. 3D, a thermosetting resin 38 in a softened state is placed on a die surface 37a of a die 37, which has the die surface 37a in a concave shape corresponding to the shape of the optical functional surface 22 of the second optical section 20. Then, the thus placed thermosetting resin 38 is pressed by the optical functional surface 11 of the first optical section 11 obtained in the aforementioned manner to a given position, and in this state, the thermosetting resin 38 is cured by heating the thermosetting resin 38. In this process, since the thermosetting resin 38 in a softened state obtained before heating is much softer than the first optical section 10, the optical functional surface 11 is substantially not changed in its shape even when the thermosetting resin 38 is pressed with the optical functional surface 11 of the first optical section 10. Also, the thermosetting resin 38 flows in accordance with the shape of the optical functional surface 11 so as to enter the concaves of the concave-convex part 12, and hence, the shape of the optical functional surface 11 can be suitably transferred. In this manner, the composite optical device 1 including the first optical section 10 and the second optical section 20 bonded to the first optical section 10 on the optical functional surface 11 can be obtained.

In the case where the first optical section 10 and the second optical section 20 are made of different materials as in Embodiment 1, the optical functional surface 11 is preferably subjected to a treatment for improving the adhesiveness between the first optical section 10 and the second optical section 20 before forming the second optical section 20 on the first optical section 10. Specifically, in the case where the first optical section 10 is substantially made of glass and the second optical section 20 is substantially made of a resin, for example, the optical functional surface 11 is preferably coated with a coupling agent such as a silane coupling agent.

Figure 4A:
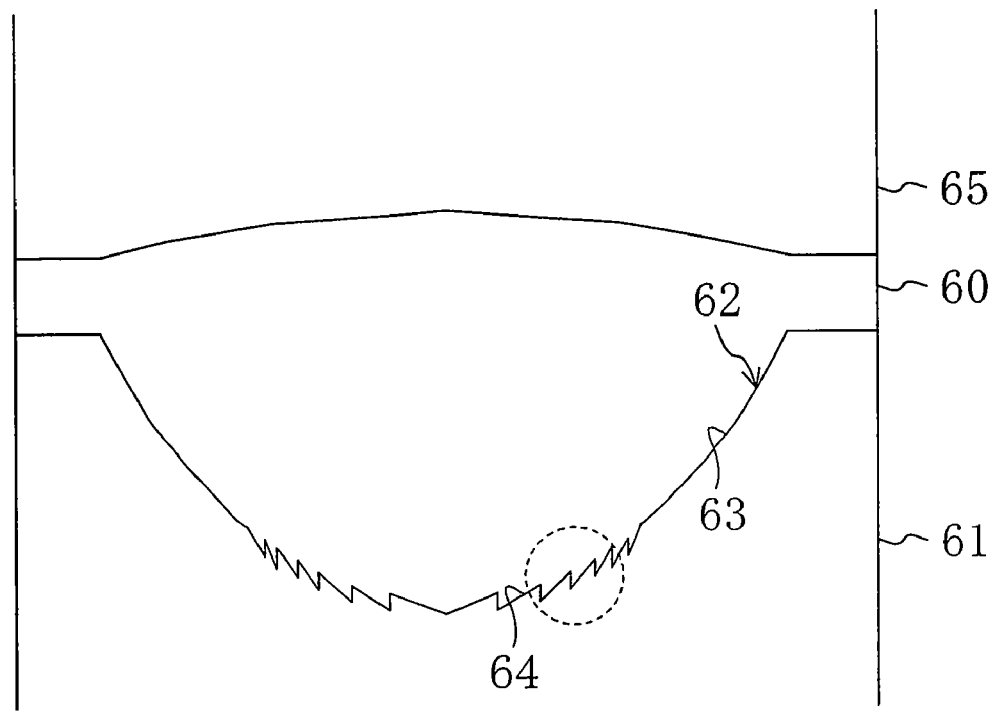
FIG. 4 shows cross-sectional views for explaining a process for forming a first optical section in which a concave-convex part of an optical functional surface is protruded from (is thicker than) a smooth part.
Figure 4B:
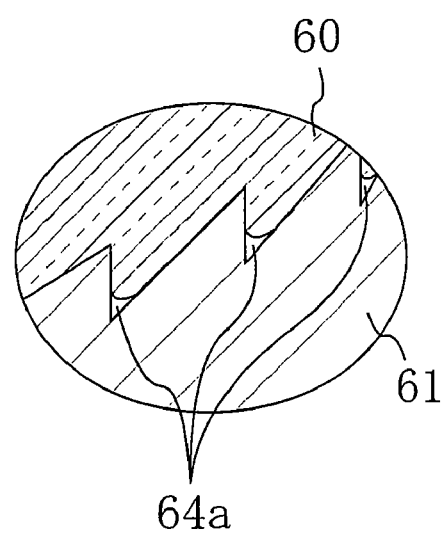

For example, in the case where a concave-convex part of an optical functional surface is protruded from (is thicker than) a smooth part, more specifically, in the case where a position, along the normal direction, of a concave bottom of the concave-convex part is farther from the center of a first optical section than a position along the normal direction of an end of the smooth part on a side of the concave-convex part, such a first optical section 60 is fabricated through press molding of a glass preform by using a lower die 61 having, on its top face, a die surface 62 including a smooth die surface portion 63 and a concave-convex die surface portion 64 receded from the smooth die surface portion 63 and an upper die 65 opposing the lower die 61 as shown in FIG. 4A. In this case, since the concave-convex die surface portion 64 is receded from the smooth die surface portion 63, the smooth die surface portion 63 comes into contact with the glass preform before the concave-convex die surface portion 64, and hence, pressure applied to the glass preform by the concave-convex die surface portion 64 is small and the quantity of pressure applied to the glass preform by the concave-convex die surface portion 64 is small. Accordingly, as shown in FIG. 4B, a gap 64a is unavoidably formed between the concave-convex die surface portion 64 of the lower die 61 and the fabricated first optical section 60. In other words, the shape of the concave-convex die surface portion 64 is not sufficiently transferred, and hence, the form accuracy of the resultant first optical section 60 is degraded. As a result, it is difficult to obtain a composite optical device with high form accuracy.

On the contrary, the concave-convex part 12 of the optical functional surface 11 is receded from (is thinner than) the smooth part 13 in Embodiment 1 as described above. More specifically, in the boundary vicinity portion NR, the position P2 along the normal direction N of the concave bottom of the concave-convex part 12 is closer to the center of the first optical section 10 than the position P1 along the normal direction N of the end of the smooth part 13 on the side of the concave-convex part 12. Accordingly, as shown in FIG. 3, in the die surface 32 corresponding to the shape of this optical functional surface 11, the concave-convex die surface portion 34 is protruded from the smooth die surface portion 33 on the contrary. Therefore, in the press molding of the glass preform 30, the concave-convex die surface portion 34 comes into contact with the glass preform 30 before the smooth die surface portion 33. Accordingly, pressure applied to the glass preform 30 by the concave-convex die surface portion 34 is large and the quantity of pressure applied to the glass preform 30 by the concave-convex die surface portion 34 is large. As a result, the shape of the concave-convex die surface portion 34 is transferred onto the glass preform 30 with comparatively high form accuracy, and hence, the first optical section 10 can be obtained with high form accuracy, resulting in obtaining the composite optical device 1 with high form accuracy.

The form accuracy of the resultant first optical section 10 tends to be higher as the pressure applied to the glass preform 30 by the concave-convex die surface portion 34 and the quantity of pressure applied to the glass preform 30 by the concave-convex die surface portion 34 are larger. Therefore, the optical functional surface 11 is preferably constructed so that the pressure applied to the glass preform 30 by the concave-convex die surface portion 34 and the quantity of pressure applied to the glass preform 30 by the concave-convex die surface portion 34 can be larger. Specifically, the optical functional surface 11 is preferably constructed so that the distance along the normal direction N between a concave bottom and a convex apex of the concave-convex part 12 (i.e., the distance between the positions P2 and P3) in the boundary vicinity portion NR can be not less than $\frac{1}{5}$ as large as the distance along the normal direction N between the end of the smooth part 13 on the side of the concave-convex part 12 and the concave bottom (i.e., the distance between the positions P1 and P2). Also, the optical functional surface 11 is preferably constructed so that the virtual aspheric surface BM including the concave bottoms of the concave-convex part 12 can be closer to the center of the first optical section 10 than the smooth part 13 in the boundary vicinity portion NR. Furthermore, the optical functional surface 11 is preferably constructed so that the position P3 along the normal direction N of the convex apex of the concave-convex part 12 can be closer to the center of the first optical section 10 than the position P1 in the boundary vicinity portion NR, and is more preferably constructed so that the respective convex apexes of the concave-convex part 12 can be closer to the center of the first optical section 10 than the virtual aspheric surface including the position P1 and having the same aspheric coefficient as the virtual aspheric surface BM in the boundary vicinity portion NR.

In the procedure for curing the thermosetting resin 38, the thermosetting resin 38 shrinks. The quantity of shrinkage of the thermosetting resin 38 depends upon the thickness of the thermosetting resin 38 (namely, the thickness of the second optical section 20). Specifically, the shrinkage is comparatively large in a portion of the thermosetting resin 38 with a large thickness and is comparatively small in a portion with a small thickness. Accordingly, in a part of the second optical section 20 disposed on the concave-convex part 12, the quantity of shrinkage is different between a portion disposed on a concave of the concave-convex part 12 and a portion disposed on a convex, and hence, it is apprehended that the optical functional surface 22 of the second optical section 20 heaves in accordance with the shape of the concave-convex part 12 in some cases. In Embodiment 1, however, the concave-convex part 12 is receded from the smooth part 13, and hence, the second optical section 20 has a comparatively large thickness on the concave-convex part 12 as compared with on the smooth part 13. Therefore, the heave of the optical functional surface 22 can be effectively suppressed.

Furthermore, if the concave-convex part 12 is protruded from the smooth part 13, when the thickness of the second optical section 20 is increased on the concave-convex part 12 for suppressing the heave of the optical functional surface 22, it unavoidably has a larger thickness on the smooth part 13. According to Embodiment 1, however, the thickness of the second optical section 20 can be made comparatively large on the concave-convex part 12 while keeping a comparatively small thickness of the second optical section 20 on the smooth part 13. Accordingly, the amount of the thermosetting resin 38 used for forming the second optical section 20 can be suppressed, so as to inexpensively realize the composite optical device 1. Furthermore, the use of the resin material that has lower transmittance against light of a short wavelength band (such as blue light, violet light and ultraviolet light) than a glass material and is poor at homogeneity and resistance to climate can be reduced to the utmost, so as to realize a composite optical device 1 with high transmittance against light of the short wavelength band and good at homogeneity and resistance to climate.

In general, glass has a higher softening temperature and higher hardness than a resin. Therefore, in the case where the first optical section 10 is substantially made of glass and the second optical section 20 is substantially made of a resin (such as a thermoplastic resin or an energy-curing resin) as described above, the composite optical device 1 can be obtained easily and with high form accuracy by pressing a resin in a softened state with the first optical section 10 made of glass and formed into a desired shape as described above used as a die, and by curing the resin for bonding them. Alternatively, in the case where an energy-curing resin such as a UV curing resin or an electron beam curing resin is used as the material for the second optical section 20, the curing process can be performed in a short period of time, and hence, the productivity can be improved. On the contrary, in the case where a thermosetting resin is used as the material for the second optical section 20, the composite optical device 1 can be obtained easily and inexpensively through a heat treatment without using a large scale system for emitting UV or an electron beam. It is noted that the "energy-curing resin" herein means a resin that is cured by providing given energy (such as heat, UV or an electron beam (EB)). Specific examples of the energy-curing resin are a thermosetting resin, a UV curing resin and an electron beam (EB) curing resin.

Although the case where the first optical section 10 is substantially made of glass is herein exemplified, similar effects can be attained even when the first optical section 10 is substantially made of a resin. Specifically, when the concave-convex part 12 of the optical functional surface 11 is receded from (is thinner than) the smooth part 13, the transferring property of the concave-convex die surface portion 34 can be improved, so that the first optical section 10 and the composite optical device 1 can be obtained with high form accuracy. Also, the heave of the optical functional surface 22 of the second optical section 20 can be suppressed.

In the case where the first optical section 10 is substantially made of a resin, in order that the shape of the optical functional surface 11 is not spoiled in bonding the second optical section 20, the second optical section 20 is preferably made of an energy-curing resin that is softer than the first optical section 10 in a softened state or a thermoplastic resin that is softer than the first optical section 10 at a molding temperature.

In the case where both of the first optical section 10 and the second optical section 20 are substantially made of resins, the composite optical device 1 can be fabricated easily and inexpensively without using expensive and complicated equipment such as a high-temperature heating apparatus as that used in the case where one of the sections is made of glass. Furthermore, since the materials for the first optical section 10 and the second optical section 20 have compositions close to each other and physical properties (such as a thermal expansion coefficient) close to each other, high adhesiveness can be realized between the first optical section 10 and the second optical section 20, and high resistance to environment such as high resistance to temperature change can be realized. Moreover, in the case where the second optical section 20 is substantially made of an energy-curing resin, the composite optical device 1 can be obtained easily and with high form accuracy by pressing the energy-curing resin in a softened state with the first optical section 10 previously molded and by curing the resin by providing the energy.

Alternatively, both of the first optical section 10 and the second optical section 20 may be substantially made of glass. Thus, the composite optical device 1 can attain high light transmittance and high resistance to climate. In the case where both of the first optical section 10 and the second optical section 20 are made of glass, a material for the first optical section 10 preferably has a higher glass transition temperature and a higher softening temperature than a material for the second optical section 20. More preferably, the second optical section 20 is made of low-melting glass.

Although the smooth part 13 is made of an aspheric surface and the concave-convex part 12 is made of a diffraction surface with a saw-toothed cross-section in Embodiment 1, the smooth part may be, for example, a plane, a spherical surface, a cylindrical surface, an ellipsoidal surface, a toric surface or the like. Also, the concave-convex part may be, for example, a diffraction surface with a rectangular or a sinusoidal cross-section, a lens array surface including a plurality of concave or convex lens surfaces, a phase step surface or an antireflection surface having an antireflection structure (such as a structure including a plurality of cone-shaped projections or cone-shaped recesses arranged at a pitch not larger than the wavelength of light to be suppressed in the reflection).

Furthermore, the first optical section 10 is not limited to one obtained by the press molding but may be obtained by etching. Also, the second optical section 20 may be formed by applying a resin material on the optical functional surface 11 by an application method such as spin coating or squeezing and curing the applied resin material.

Modification 1

Figure 5:
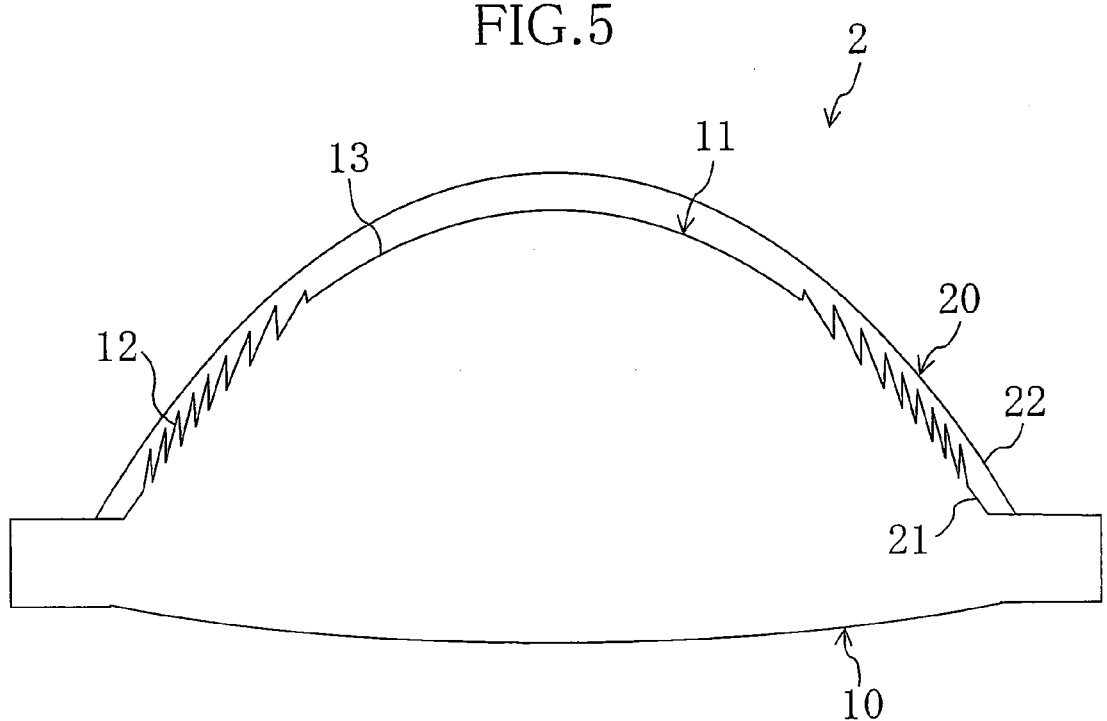
FIG. 5 is a cross-sectional view of a composite optical device 2 according to Modification 1.
Figure 6:
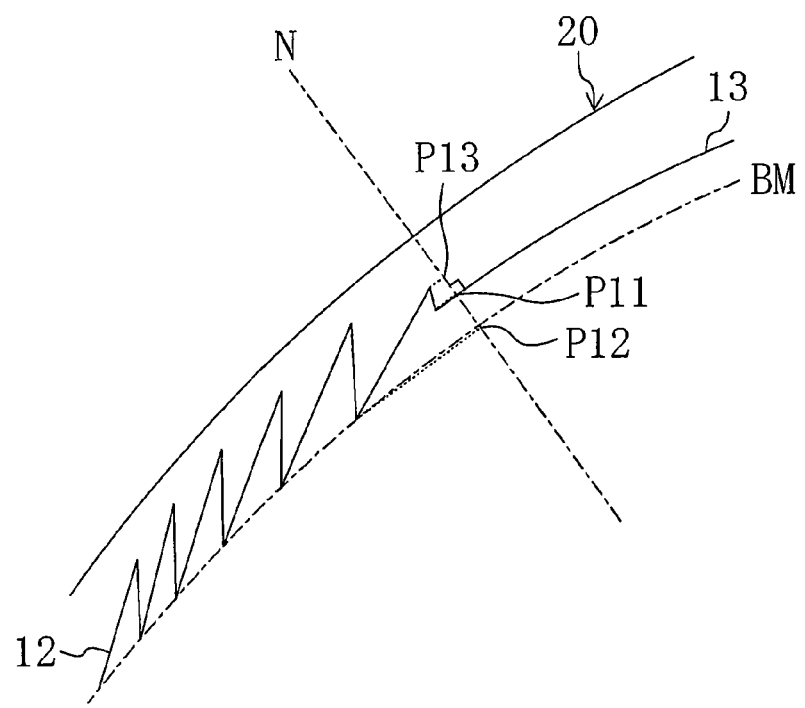
FIG. 6 is an enlarged cross-sectional view of a boundary vicinity portion NR of the composite optical device 2.

FIG. 5 is a cross-sectional view of a composite optical device 2 according to Modification 1. FIG. 6 is an enlarged cross-sectional view of a boundary vicinity portion NR of the composite optical device 2.

In the example described in Embodiment 1 above, the concave-convex part 12 is positioned at the center of the optical functional surface 11 and the smooth part 13 is provided around the concave-convex part 12. Instead, the smooth part 13 may be positioned at the center of the optical functional surface 11 with the concave-convex part 12 provided around the smooth part 13. Such a structural example will be described in this Modification 1. It is noted that the same reference numerals are used to refer to composing elements having substantially the same functions as in Embodiment 1 so as to omit the description.

In Modification 1, an optical functional surface 11 includes a smooth part 13 positioned at the center and a concave-convex part 12 provided around and adjacent to the smooth part 13. In addition, as shown in FIG. 6, the optical functional surface 11 is constructed so that a position P12, along the normal direction N of the smooth part 13, of a concave bottom of the concave-convex part 12 can be closer to the center of the first optical section 10 than a position P11 along the normal direction N of an end of the smooth part 13 on a side of the concave-convex part 12 in the boundary vicinity portion NR between the smooth part 13 and the concave-convex part 12. In other words, the concave-convex part 12 is receded from (is thinner than) the smooth part 13. Therefore, in a die surface of a die used for forming the optical functional surface 11, a concave-convex surface portion (hereinafter sometimes referred to as the concave-convex die surface portion) of a die surface corresponding to the concave-convex part 12 is protruded from a smooth surface portion (hereinafter sometimes referred to as the smooth die surface portion) of the die surface corresponding to the smooth part 13. Accordingly, in the same manner as in Embodiment 1 described above, since the shape of the concave-convex die surface portion is transferred onto a glass preform with comparatively high form accuracy, a first optical section 10 with high form accuracy can be obtained, so that the composite optical device 2 can be obtained with high form accuracy. Also, since the thickness of a portion of a second optical section 20 disposed on the concave-convex part 12 can be comparatively large, the heave of an optical functional surface 22 can be suppressed.

Also in Modification 1 in the same manner as in Embodiment 1, from the viewpoint of fabrication easiness, a distance along the normal direction N between a concave bottom and a convex apex of the concave-convex part 12 (i.e., a distance between positions P12 and P13) in the boundary vicinity portion NR is preferably not less than ⅕ as large as a distance along the normal direction N between the end of the smooth part 13 on a side of the concave-convex part 12 and the concave bottom (i.e., a distance between the positions P11 and P12). Also, in the boundary vicinity portion NR, a virtual aspheric surface BM including the concave bottoms of the concave-convex part 12 is preferably closer to the center of the first optical section 10 than the smooth part 13. Furthermore, in the boundary vicinity portion NR, the position P13 along the normal direction N of the convex apex of the concave-convex part 12 is preferably closer to the center of the first optical section 10 than the position P11, and the respective convex apexes of the concave-convex part 12 are more preferably closer to the center of the first optical section 10 than a virtual aspheric surface including the position P11 and having the same aspheric coefficient as the virtual aspheric surface BM.

Embodiment 2

In Embodiment 1 and Modification 1 described above, the description is made on the composite optical device using, as the first optical section 10, the biconvex lens having the concave-convex part 12 made of a diffraction surface, but the concave-convex part is not limited to a diffraction surface in this invention. Also, the first optical section is not limited to a lens like a biconvex lens. The first optical section may be, for example, a meniscus or biconcave lens, or in a parallel plate shape.

In Embodiment 2, an example of a composite optical device including a first optical section 50 in the parallel plate shape will be described in detail with reference to FIGS. 7 and 8. In the description of Embodiment 2, the same reference numerals are used to refer to composing elements having substantially the same functions as in Embodiment 1 so as to omit the description.

Figure 7:
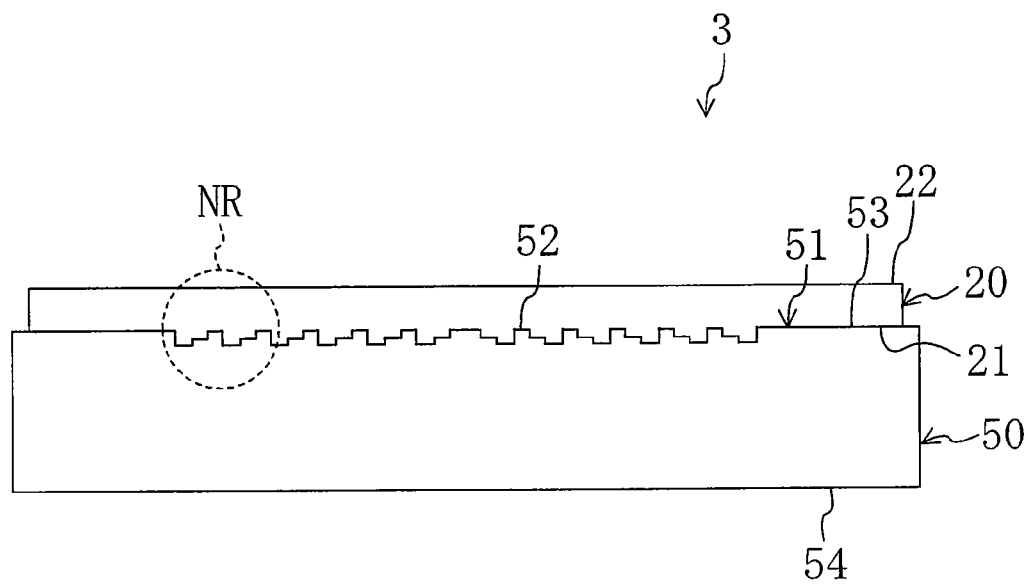
FIG. 7 is a cross-sectional view of a composite optical device 3 according to Embodiment 2.
Figure 8:
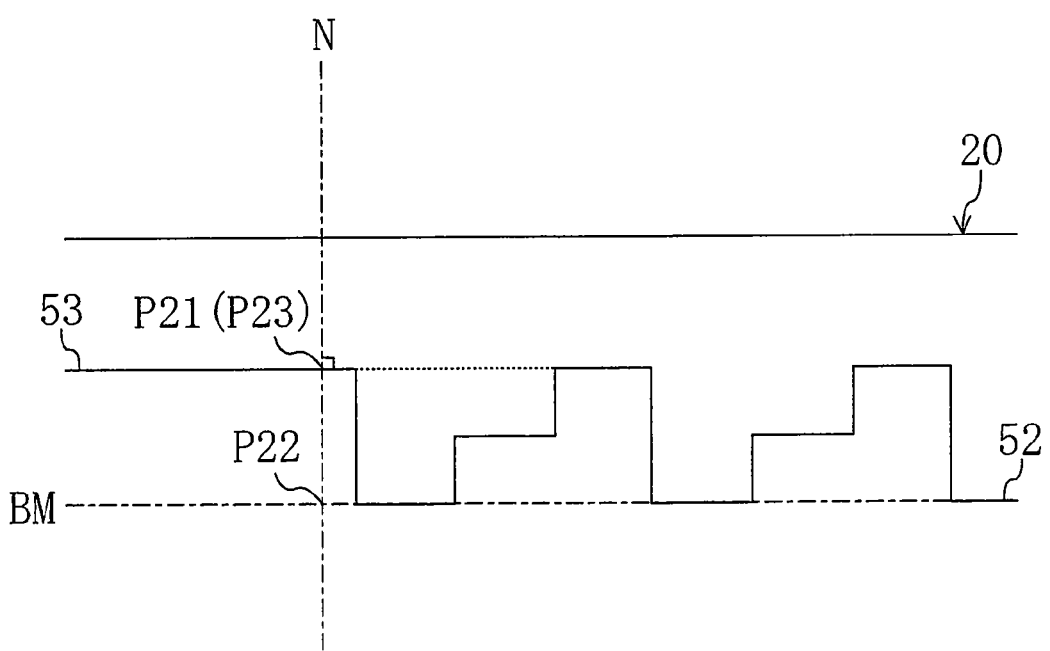
FIG. 8 is an enlarged cross-sectional view of a boundary vicinity portion NR of the composite optical device 3.

FIG. 7 is a cross-sectional view of a composite optical device 3 according to Embodiment 2. FIG. 8 is an enlarged cross-sectional view of a boundary vicinity portion NR of the composite optical device 3.

The composite optical device 3 of Embodiment 2 includes a first optical section 50 and a second optical section 20. The first optical section 50 includes an optical functional surface 54 in a plane shape and an optical functional surface 51 opposing and substantially in parallel to the optical functional surface 54. The optical functional surface 51 includes a concave-convex part 52 provided at the center and a flat smooth part 53 provided around the concave-convex part 52. The second optical section 20 is bonded to the first optical section 50 on the optical functional surface 51, and has an optical functional surface 22 opposing an optical functional surface 21 bonded to the first optical section 50 and formed as a smooth surface substantially in parallel to the optical functional surfaces 51 and 54 of the first optical section 50.

In Embodiment 2, the concave-convex part 52 is formed as what is called a step-shaped diffraction surface in which bevels of respective relieves are formed in a step shape in a cross-sectional view. Therefore, out of substantially parallel beams vertically entering the composite optical device 3, light entering a region of the flat smooth part 53 is not substantially shifted in its phase by the composite optical device 3 but outgoes from the composite optical device 3 as substantially parallel beams. On the other hand, substantially parallel beams entering a region of the concave-convex part 52 formed as the so-called step-shaped diffraction surface outgo from the composite optical device 3 with the phase shifted by the concave-convex part 52. For example, in the concave-convex part 52 in the shape shown in FIG. 7, substantially parallel beams entering the region of the concave-convex part 52 outgo from the composite optical device 3 as collected beams.

Next, the specific shape of the optical functional surface 51 will be described in detail with reference to FIG. 8. The optical functional surface 51 is constructed so that a position P22, along the normal direction N of the flat smooth part 53, of a concave bottom of the concave-convex part 52 can be closer to the center of the first optical section 50 than a position P21 along the normal direction N of an end of the flat smooth part 53 on a side of the concave-convex part 52 in a boundary vicinity portion NR between the flat smooth part 53 and the concave-convex part 52. In other words, the concave-convex part 52 is receded from (is thinner than) the flat smooth part 53. Therefore, in a die surface of a die used for forming the optical functional surface 51, a concave-convex die surface portion corresponding to the concave-convex part 52 is protruded from a smooth die surface portion corresponding to the flat smooth part 53. Accordingly, in the same manner as in Embodiment 1, since the shape of the concave-convex die surface portion is transferred onto a glass preform with comparatively high form accuracy, the first optical section 50 can be obtained with high form accuracy, resulting in obtaining the composite optical device 3 with high form accuracy. Also, since the thickness of a portion of the second optical section 20 disposed on the concave-convex part 52 can be comparatively large, the heave of the optical functional surface 22 can be suppressed.

Also in Modification 1 in the same manner as in Embodiment 1, from the viewpoint of fabrication easiness, a distance along the normal direction N between a concave bottom and a convex apex of the concave-convex part 12 (i.e., a distance between positions P22 and P23) in the boundary vicinity portion NR is preferably not less than ⅕ as large as a distance along the normal direction N between the end of the flat smooth part 53 on the side of the concave-convex part 52 and the concave bottom (i.e., a distance between the positions P21 and P22). Also, in the boundary vicinity portion NR, a virtual plane BM including the concave bottoms of the concave-convex part 52 is preferably closer to the center of the first optical section 50 (namely, lower in FIG. 8) than the flat smooth part 53. Furthermore, in the boundary vicinity portion NR, the position P23 along the normal direction N of the convex apex of the concave-convex part 52 is preferably closer to the center of the first optical section 50 than the position P21, and the respective convex apexes of the concave-convex part 52 are more preferably closer to the center of the first optical section 50 (namely, lower in FIG. 8) than a virtual plane including the flat smooth part 53. However, as shown in FIG. 8, from the viewpoint of optical design, the position P21 along the normal direction N of the end of the flat smooth part 53 on the side of the concave-convex part 52 may be the same as the position P23 along the normal direction N of the convex apex of the concave-convex part 52, or the position P21 may be closer to the center of the first optical section 50 (namely, lower in FIG. 8) than the position P23.

Modification 2

Modification 2 is a modification of Embodiment 2 described above. In Modification 2, a concave-convex part made of a lens array surface will be described in detail with reference to FIGS. 9 and 10. In the description of Modification 2, the same reference numerals are used to refer to composing elements having substantially the same functions as in Embodiment 1 or 2 so as to omit the description.

Figure 9:
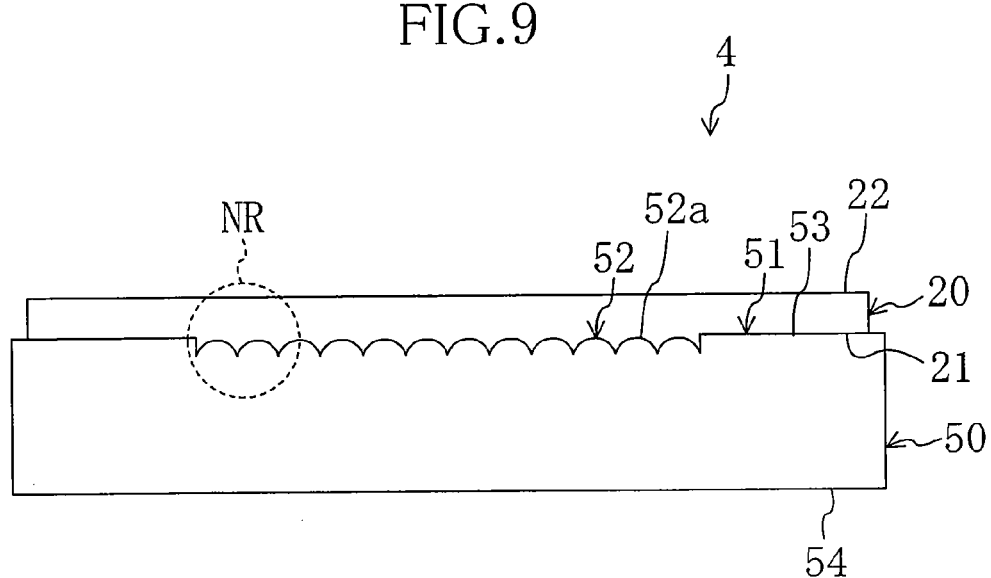
FIG. 9 is a cross-sectional view of a composite optical device 4 according to Modification 2.
Figure 10:
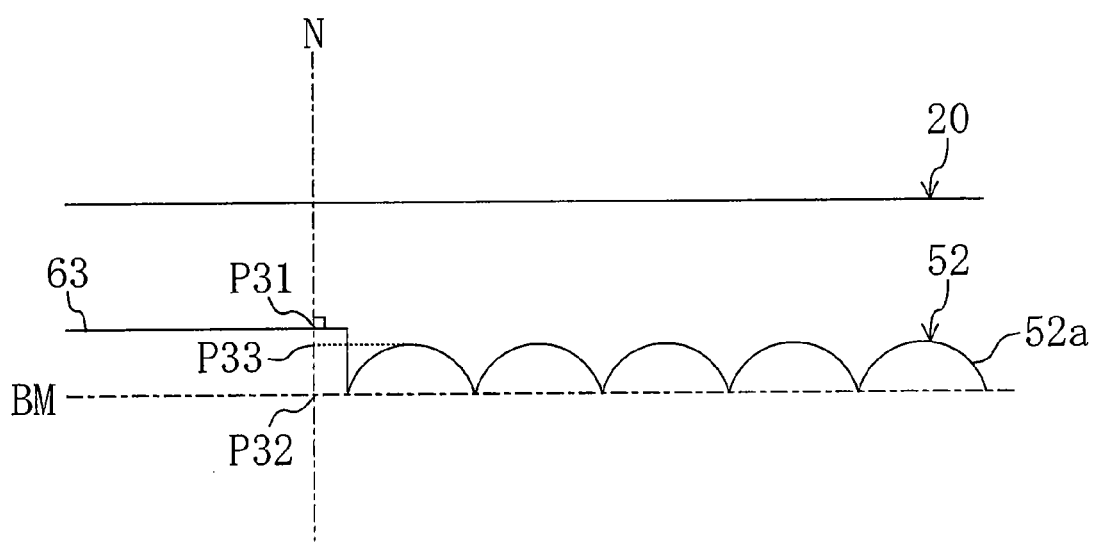
FIG. 10 is an enlarged cross-sectional view of a boundary vicinity portion NR of the composite optical device 4.

FIG. 9 is a cross-sectional view of a composite optical device 4 according to Modification 2. FIG. 10 is an enlarged cross-sectional view of a boundary vicinity portion NR of the composite optical device 4.

In Modification 2, a concave-convex part 52 is formed as a lens array surface (i.e., a surface on which a plurality of concave or convex lens surfaces 52a are arranged). Therefore, out of substantially parallel beams vertically entering the composite optical device 4, light entering a region of a flat smooth part 53 is not substantially shifted in the phase by the composite optical device 4 but outgoes from the composite optical device 4 as substantially parallel beams. On the other hand, substantially parallel beams entering a portion of the concave-convex part 52 formed as the lens array surface outgo from the composite optical device 4 with the phase shifted by the concave-convex part 52.

Next, the specific shape of an optical functional surface 51 will be described in detail with reference to FIG. 10. The optical functional surface 51 is constructed so that a position P32, along the normal direction N of the flat smooth part 53, of a convex bottom of the concave-convex part 52 can be closer to the center of a first optical section 50 than a position P31 along the normal direction N of an end of the flat smooth part 53 on a side of the concave-convex part 52 in the boundary vicinity portion NR between the flat smooth part 53 and the concave-convex part 52. In other words, the concave-convex part 52 is receded from (is thinner than) the flat smooth part 53. Therefore, in a die surface of a die used for forming the optical functional surface 51, a concave-convex die surface portion corresponding to the concave-convex part 52 is protruded from a smooth die surface portion corresponding to the flat smooth part 53. Accordingly, in the same manner as in Embodiment 1, since the shape of the concave-convex die surface portion is transferred onto a glass preform with comparatively high form accuracy, the first optical section 50 can be obtained with high form accuracy, resulting in obtaining the composite optical device 4 with high form accuracy. Also, since the thickness of a portion of a second optical section 20 disposed on the concave-convex part 52 can be comparatively large, the heave of an optical functional surface 22 can be suppressed.

Also in Modification 1 in the same manner as in Embodiment 1, from the viewpoint of fabrication easiness, a distance along the normal direction N between a concave bottom and a convex apex of the concave-convex part 52 (i.e., a distance between positions P32 and P33) in the boundary vicinity portion NR is preferably not less than ⅕ as large as a distance along the normal direction N between the end of the flat smooth part 53 on the side of the concave-convex part 52 and the concave bottom (i.e., a distance between the positions P31 and P32). Also, in the boundary vicinity portion NR, a virtual plane BM including the concave bottoms of the concave-convex part 52 is preferably closer to the center of the first optical section 50 (namely, lower in FIG. 10) than the flat smooth part 53. Furthermore, in the boundary vicinity portion NR, the position P33 along the normal direction N of the convex apex of the concave-convex part 52 is preferably closer to the center of the first optical section 50 than the position P31, and the convex apexes of the concave-convex part 52 are more preferably closer to the center of the first optical section 50 (namely, lower in FIG. 10) than a virtual plane including the flat smooth part 53.

Modification 3

Modification 3 is a further modification of Modification 1. In Modification 3, an example of a concave-convex part made of a phase step surface will be described in detail with reference to FIG. 11. In the description of Modification 3, the same reference numerals are used to refer to composing elements having substantially the same functions as in Embodiment 1 or Modification 1 so as to omit the description. Furthermore, FIG. 5 is also referred to commonly to Modification 1.

Figure 11:
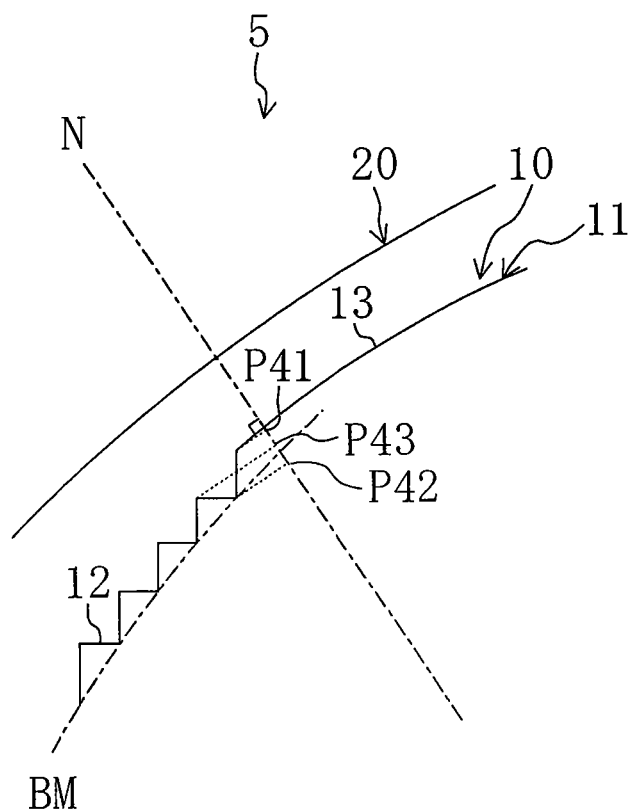
FIG. 11 is an enlarged cross-sectional view of a boundary vicinity portion NR of a composite optical device 5 according to Modification 3.

FIG. 11 is an enlarged cross-sectional view of a boundary vicinity portion NR of a composite optical device 5 according to Modification 3.

In Modification 3, a concave-convex part 12 is made of a phase step surface with a step-shaped cross-section. More specifically, an optical functional surface 11 is constructed so that a position P42, along the normal direction N of a smooth part 13, of a concave bottom of the concave-convex part 12 can be closer to the center of a first optical section 10 than a position P41 along the normal direction N of an end of the smooth part 13 on a side of the concave-convex part 12. In other words, the concave-convex part 12 is receded from (is thinner than) the smooth part 13. Therefore, in a die surface of a die used for forming the optical functional surface 11, a concave-convex die surface portion corresponding to the concave-convex part 12 is protruded from a smooth die surface portion corresponding to the smooth part 13. Accordingly, in the same manner as in Embodiment 1, since the shape of the concave-convex die surface portion is transferred onto a glass preform with comparatively high form accuracy, the first optical section 10 can be obtained with high form accuracy, resulting in obtaining the composite optical device 5 with high form accuracy. Also, since the thickness of a portion of a second optical section 20 disposed on the concave-convex part 12 can be comparatively large, the heave of an optical functional surface 22 can be suppressed.

Also in Modification 3 in the same manner as in Embodiment 1, from the viewpoint of fabrication easiness, a distance along the normal direction N between a concave bottom and a convex apex of the concave-convex part 12 (i.e., a distance between positions P42 and P43) in the boundary vicinity portion NR is preferably not less than ⅕ as large as a distance along the normal direction N between the end of the smooth part 13 on the side of the concave-convex part 12 and the concave bottom (i.e., a distance between the positions P41 and P42). Also, in the boundary vicinity portion NR, a virtual aspheric surface BM including the concave bottoms of the concave-convex part 12 is preferably closer to the center of the first optical section 10 than the smooth part 13. Furthermore, in the boundary vicinity portion NR, the position P13 along the normal direction N of the convex apex of the concave-convex part 12 is preferably closer to the center of the first optical section 10 than the position P11, and the respective convex apexes of the concave-convex part 12 are more preferably closer to the center of the first optical section 10 than a virtual aspheric surface including the position P11 and having the same aspheric coefficient as the virtual aspheric surface BM.

Modification 4

Modification 4 is a further modification of Embodiment 2. In Modification 4, an example of a concave-convex part made of an antireflection surface having an antireflection structure will be described in detail with reference to FIG. 12. In the description of Modification 4, the same reference numerals are used to refer to composing elements having substantially the same functions as in Embodiment 1 or 2 so as to omit the description. Furthermore, FIG. 7 is also referred to commonly to Embodiment 2.

Figure 12:
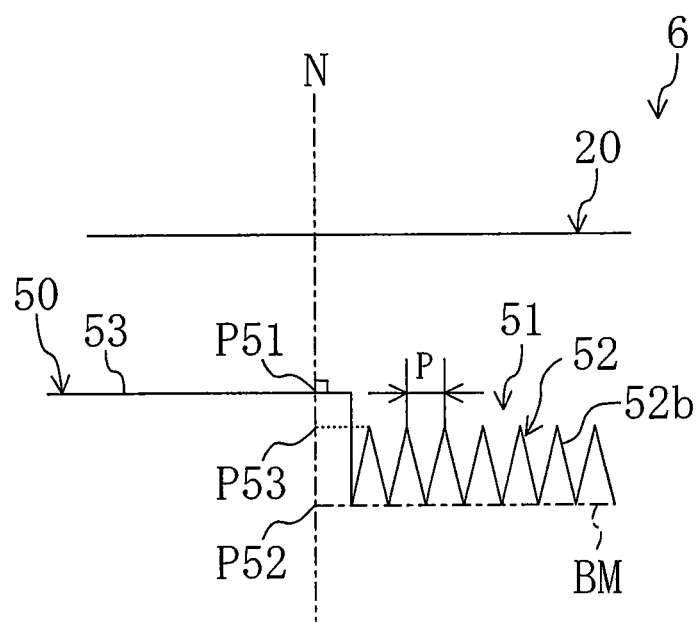
FIG. 12 is an enlarged cross-sectional view of a boundary vicinity portion NR of a composite optical device 6 according to Modification 4.

FIG. 12 is an enlarged cross-sectional view of a boundary vicinity portion NR of a composite optical device 6 of Modification 4.

In Modification 4, a concave-convex part 52 is formed as an antireflection surface having an antireflection structure in which a plurality of cone-shaped projections 52b are arranged at a pitch P not larger than the wavelength of light to be reflected. Therefore, out of substantially parallel beams vertically entering the composite optical device 6, light entering a region of the concave-convex part 52 is suppressed in the reflection by the concave-convex part 52, and hence transmits at comparatively high transmittance as compared with in a region of a high flat smooth part 53 so as to outgo from the composite optical device 6.

As shown in FIG. 12, an optical functional surface 51 is constructed so that a position P52, along the normal direction N of the flat smooth part 53, of a concave bottom of the concave-convex part 52 can be closer to the center of a first optical center 10 than a position P51 along the normal direction N of an end of the flat smooth part 53 on a side of the concave-convex part 52. In other words, the concave-convex part 52 is receded from (is thinner than) the flat smooth part 53. Therefore, in a die surface of a die used for forming the optical functional surface 51, a concave-convex die surface portion corresponding to the concave-convex part 52 is protruded from a smooth die surface portion corresponding to the flat smooth part 53. Accordingly, in the same manner as in Embodiment 1, since the shape of the concave-convex die surface portion is transferred onto a glass preform with comparatively high form accuracy, the first optical section 10 can be obtained with high form accuracy, resulting in obtaining the composite optical device 5 with high form accuracy. Also, since the thickness of a portion of a second optical section 20 disposed on the concave-convex part 52 can be comparatively large, the heave of an optical functional surface 22 can be suppressed.

Also in Modification 4 in the same manner as in Embodiment 1, from the viewpoint of fabrication easiness, a distance along the normal direction N between a concave bottom and a convex apex of the concave-convex part 52 (i.e., a distance between positions P52 and P53) in the boundary vicinity portion NR is preferably not less than ⅕ as large as a distance along the normal direction N between the end of the flat smooth part 53 on the side of the concave-convex part 52 and the concave bottom (i.e., a distance between the positions P51 and P52). Also, in the boundary vicinity portion NR, a virtual plane BM including the concave bottoms of the concave-convex part 52 is preferably closer to the center of the first optical section 50 (namely, lower in FIG. 12) than the flat smooth part 53. Furthermore, in the boundary vicinity portion NR, the position P53 along the normal direction N of the convex apex of the concave-convex part 52 is preferably closer to the center of the first optical section 50 than the position P51, and the convex apexes of the concave-convex part 52 are more preferably closer to the center of the first optical section 50 (namely, lower in FIG. 12) than a virtual plane including the flat smooth part 53.

Embodiment 3

Figure 13:
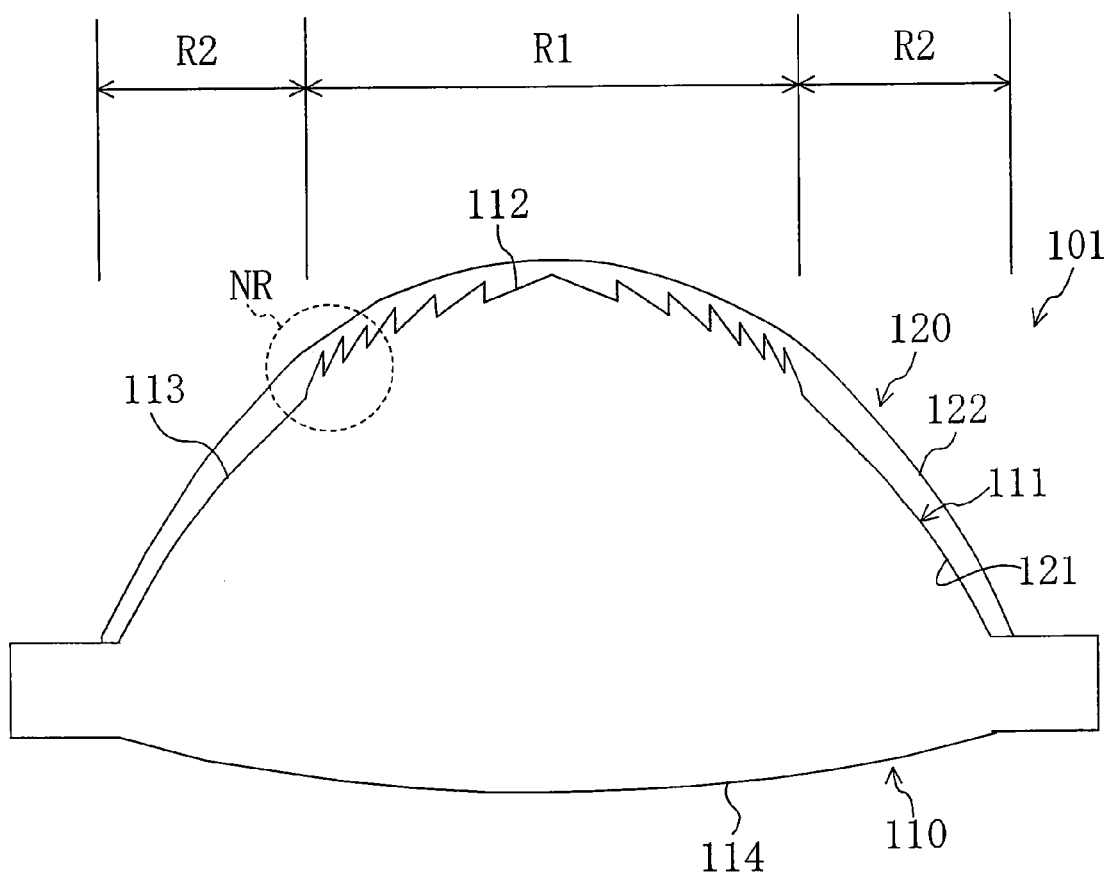
FIG. 13 is a cross-sectional view of a composite optical device 101 according to Embodiment 3.
Figure 14:
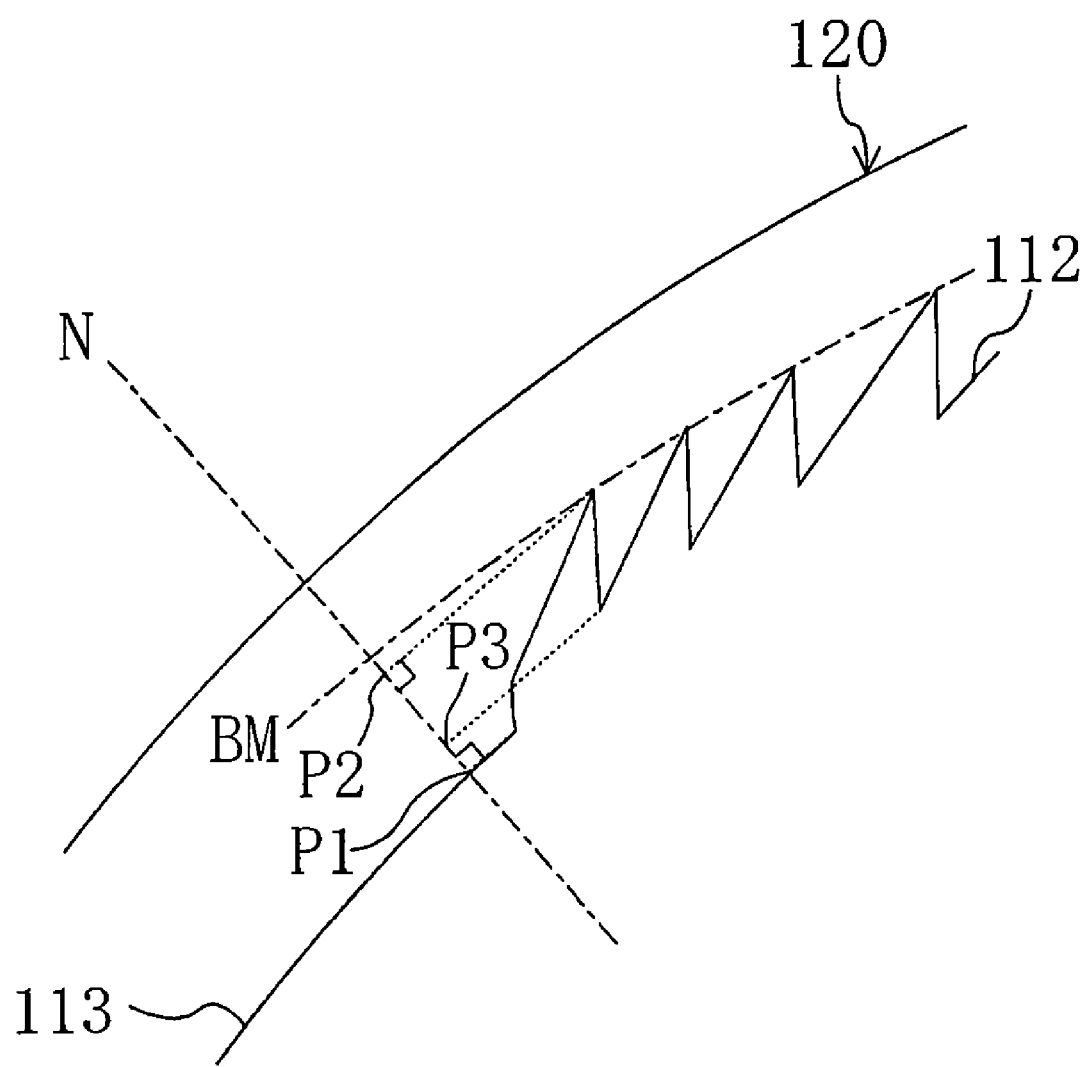
FIG. 14 is an enlarged cross-sectional view of a boundary vicinity portion NR of the composite optical device 101.

FIG. 13 is a cross-sectional view of a composite optical device 101 according to Embodiment 3. FIG. 14 is an enlarged cross-sectional view of a boundary vicinity portion NR of the composite optical device 101.

The composite optical device 101 of this Embodiment 3 includes a first optical section 110 and a second optical section 120. The first optical section 110 is composed of a biconvex lens having an optical functional surface (lens surface) 111 and an optical functional surface (lens surface) 114 both of which are convex aspheric surfaces. The optical functional surface 111 includes a concave-convex part 112 provided at the center and a smooth part 113 provided adjacent to the concave-convex part 112. Specifically, in Embodiment 3, the concave-convex part 112 is made of a diffraction surface having a saw-toothed cross-section. The second optical section 120 is composed of a meniscus lens bonded to the first optical section 110 on the optical functional surface 111. The second optical section 120 has, on a side of the first optical section 110, an optical functional surface 121 in the shape corresponding to the optical functional surface 111, and specifically, the optical functional surface 121 includes a diffraction surface provided at the center and a smooth surface adjacent to the diffraction surface. On the other hand, an optical functional surface 122 opposing the optical functional surface 121 is wholly made of a smooth surface.

In Embodiment 3, since the optical functional surface 111 includes the concave-convex part 112 and the smooth part 113 as described above, optical power of the optical functional surface 111 obtained in a center region R1 (see FIG. 13) where the concave-convex part 112 is provided is made different from optical power of the optical functional surface 111 obtained in a peripheral region R2 where the smooth part 113 is provided. Accordingly, for example, light of a given wavelength can be collected by using the center region R1 as well as light of a different wavelength can be collected by using the peripheral region R2. Specifically, when this composite optical device 101 is used as an objective lens, for example, light of a wavelength of approximately 655 nm can be collected by the center region R1 of the composite optical device 101 onto an information recording surface of a DVD and light of a wavelength of approximately 405 nm can be collected by using the center region R1 and the peripheral region R2 onto an information recording surface of a BD. Thus, an optical pickup having compatibility with a plurality of kinds of information recording media (such as optical disks) can be realized. It is noted that the concave-convex part 112 may further include a plurality of diffraction surfaces with different optical power and that the center region R1 may include a plurality of regions with different optical power.

Furthermore, in the composite optical device 101 of Embodiment 3, the second optical section 120 is bonded onto the optical functional surface 111 having the concave-convex part 112 made of a diffraction surface. Therefore, the dependency on wavelength of the concave-convex part 112 can be reduced, so that high diffraction efficiency can be realized not only in light of the blaze wavelength but also in light of a wavelength different from the blaze wavelength.

In Embodiment 3, the optical functional surface 111 is constructed as shown in FIG. 14 so that a position P2, along the normal direction N of the smooth part 113, of a convex apex of the concave-convex part 112 can be farther from the center of the first optical section 110 than a position P1 along the normal direction N of an end of the smooth part 113 on a side of the concave-convex part 112 in the boundary vicinity portion NR (see FIG. 13) between the smooth part 113 and the concave-convex part 112. In other words, the concave-convex part 112 is protruded from (is thicker than) the smooth part 113. Therefore, the composite optical device 101 can be easily fabricated with high form accuracy as described in detail below.

From the viewpoint of fabrication easiness, a distance along the normal direction N between a concave bottom and a convex apex of the concave-convex part 112 (i.e., a distance between positions P2 and P3) in the boundary vicinity portion NR is preferably not more than five times (more preferably twice and specifically 1.5 times) as large as a distance along the normal direction N between the end of the smooth part 113 on the side of the concave-convex part 112 and the concave bottom (i.e., a distance between the positions P1 and P2). Also, in the boundary vicinity portion NR, a virtual aspheric surface BM including the convex apexes of the concave-convex part 112 is preferably farther from the center of the first optical section 110 than the smooth part 113. Furthermore, in the boundary vicinity portion NR, the position P3 along the normal direction N of the concave bottom of the concave-convex part 112 is preferably farther from the center of the first optical section 110 than the position P1, and the concave bottoms of the concave-convex part 112 are more preferably farther from the center of the first optical section 110 than a virtual aspheric surface including the position P1 and having the same aspheric coefficient as the virtual aspheric surface BM.

Next, a method for fabricating the composite optical device 101 of Embodiment 3 will be described with reference to FIG. 15.

First, the first optical section 110 is fabricated. For example, when the first optical section 110 is substantially made of glass, the first optical section 110 can be fabricated through procedures, for example, shown in FIGS. 15A through 15C. Specifically, a glass preform 130 is disposed between a lower die 131 having, on its top face, a die surface 132 in a shape corresponding to the optical functional surface 111 and an upper die 135 having a die surface in a shape corresponding to the optical functional surface 114 on its top face opposing the die surface 132. Then, the glass preform 130 is heated to a temperature close to its softening temperature, and thereafter, the press molding is performed with the upper die 135 and the lower die 131, resulting in obtaining the first optical section 110 as shown in FIG. 15B. FIG. 15C is a cross-sectional view of the thus obtained first optical section 110.

Next, the second optical section 120 is pressed against and bonded onto the optical functional surface 111 of the first optical section 110. Specifically, as shown in FIG. 15D, a resin 138 in a softened state is placed on a die surface 137a of a die 137, which has the die surface 137a in a concave shape corresponding to the shape of the optical functional surface 122 of the second optical section 120. Then, the thus placed resin 138 is pressed with the optical functional surface 111 of the first optical section 110 to a given position, and in this state, the resin 138 is cured. In the case where the resin 138 is an energy-curing resin (such as a thermosetting resin, a UV curing resin, an electron beam (EB) curing resin), the resin 138 can be cured by providing corresponding energy (such as heat, UV or an electron beam). Alternatively, in the case where it is a thermoplastic resin, it can be cured by cooling.

In this procedure for the second optical section 120, since the resin 138 in a softened state is much softer than the first optical section 110, the optical functional surface 111 is substantially not changed in its shape even when the resin 138 is pressed with the optical functional surface 111 of the first optical section 110. Also, the resin 138 flows in accordance with the shape of the optical functional surface 111 so as to enter concaves of the concave-convex part 112, and hence, the shape of the optical functional surface 111 can be suitably transferred. In this manner, the composite optical device 101 including the first optical section 110 and the second optical section 120 bonded to the first optical section 110 on the optical functional surface 111 can be obtained.

In the case where the first optical section 110 and the second optical section 120 are made of different materials, the optical functional surface 111 is preferably subjected to a treatment for improving the adhesiveness between the first optical section 110 and the second optical section 120 before forming the second optical section 120 on the first optical section 110. Specifically, in the case where the first optical section 110 is substantially made of glass and the second optical section 120 is substantially made of a resin, for example, the optical functional surface 111 is preferably coated with a coupling agent such as a silane coupling agent.

Figure 16A:
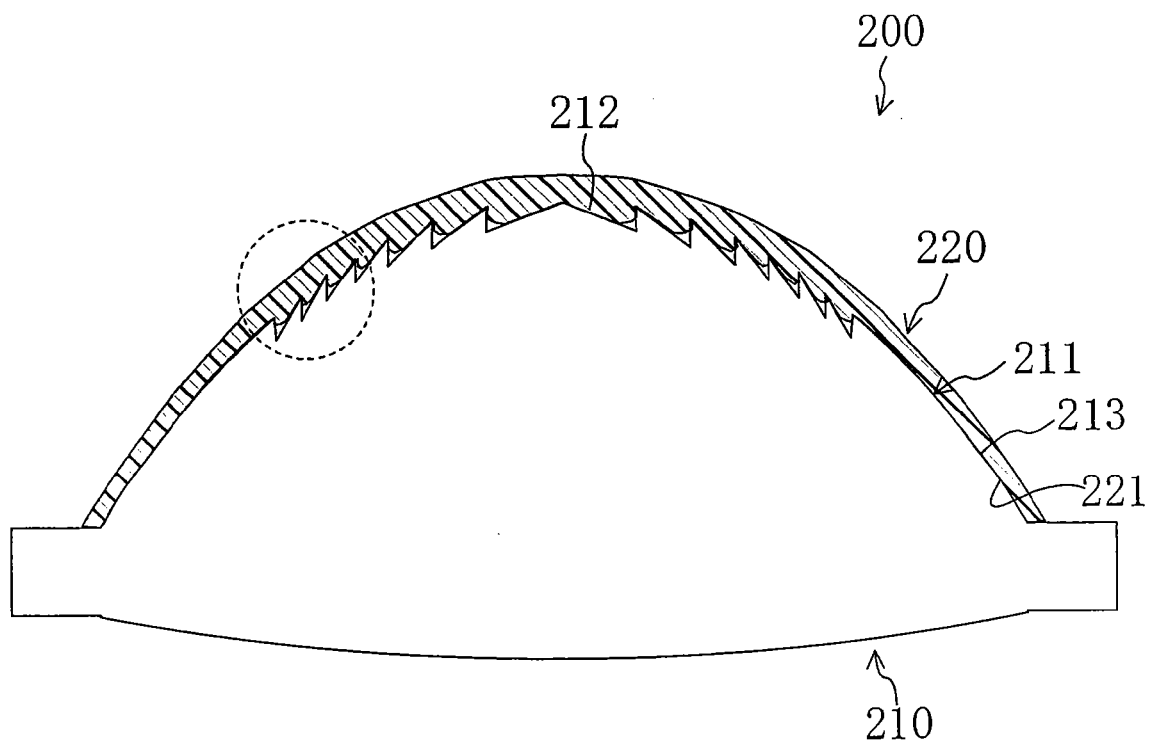
FIG. 16 shows cross-sectional views of a composite optical device 200.
Figure 16B:
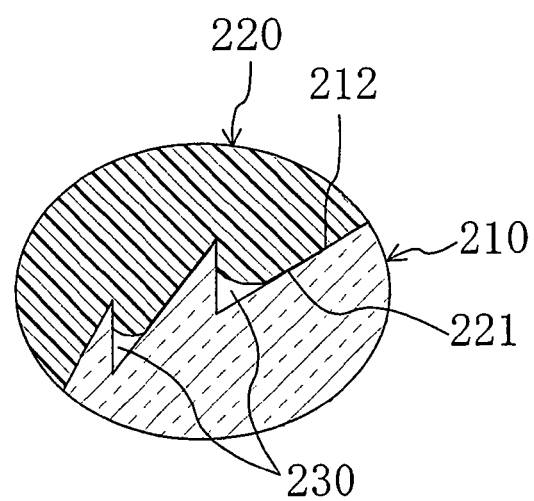

For example, in the case where a concave-convex part 212 of an optical functional surface 211 is receded from (is thinner than) a smooth part 213 as shown in FIG. 16, more specifically, in the case where a position along the normal direction of a convex apex of the concave-convex part 212 is closer to the center of a first optical section 210 than a position along the normal direction of an end of the smooth part 213 on a side of the concave-convex part, the smooth part 213 comes into contact with a resin before the concave-convex part 212 in the procedure for forming a second optical section 220 by pressing and bonding the resin in a softened state. Therefore, pressure applied to the resin by the concave-convex part 212 is small and the quantity of pressure applied to the resin by the concave-convex part 212 is small. Accordingly, the resin cannot be sufficiently filled in concaves of the concave-convex part 212, and as shown in FIG. 16, it is apprehended that a gap 230 is unavoidably formed between the optical functional surface 211 of the first optical section 210 and the optical functional surface 221 of the second optical section 220. In this manner, in the case where a concave-convex part of an optical functional surface is receded from (is thinner than) a smooth part, it is difficult to obtain a composite optical device with high form accuracy.

On the contrary, the concave-convex part 112 of the optical functional surface 111 is protruded from (is thicker than) the smooth part 113 in Embodiment 3 as described above. More specifically, in the boundary vicinity portion NR, the position P2 along the normal direction N of the convex apex of the concave-convex part 112 is farther from the center of the first optical section 110 than the position P1 along the normal direction N of the end of the smooth part 113 on the side of the concave-convex part 112. Accordingly, in the procedure for forming the second optical section 120 shown in FIGS. 15D and 15E, the concave-convex part 112 comes into contact with the resin 138 in a softened state before the smooth part 113. Accordingly, pressure applied to the resin 138 by the concave-convex part 112 is large and the quantity of pressure applied to the resin 138 by the concave-convex part 112 is large. As a result, the concaves of the concave-convex part 112 can be definitely filled with the resin 138 in a softened state, and hence, a gap is minimally formed between the first optical section 110 and the second optical section 120. As a result, the second optical section 120 can be obtained with high form accuracy, and the composite optical device 101 can be obtained with high form accuracy.

The form accuracy of the second optical section 120 tends to be higher as the pressure applied to the resin 138 by the concave-convex part 112 and the quantity of pressure applied to the resin 138 by the concave-convex part 112 are larger. Therefore, the optical functional surface 111 is preferably constructed so that the pressure applied to the resin 138 by the concave-convex part 112 and the quantity of pressure applied to the resin 138 by the concave-convex part 112 can be larger. Specifically, the distance along the normal direction N between a concave bottom and a convex apex of the concave-convex part 112 (i.e., the distance between the positions P2 and P3) in the boundary vicinity portion NR is preferably not more than five times (more preferably twice and specifically 1.5 times) as large as the distance along the normal direction N between the end of the smooth part 113 on the side of the concave-convex part 112 and the concave bottom (i.e., the distance between the positions P1 and P2). Also, the optical functional surface 111 is preferably constructed so that the virtual aspheric surface BM including the convex apexes of the concave-convex part 112 can be farther from the center of the first optical section 110 than the smooth part 113 in the boundary vicinity portion NR. Furthermore, the position P3 along the normal direction N of the concave bottom of the concave-convex part 112 is preferably farther from the center of the first optical section 110 than the position P1 in the boundary vicinity portion NR, and the concave bottoms of the concave-convex part 112 are more preferably farther from the center of the first optical section 110 than a virtual aspheric surface including the position P1 and having the same aspheric coefficient as the virtual aspheric surface BM in the boundary vicinity portion NR.

In Embodiment 3, the materials for the first optical section 110 and the second optical section 120 are not particularly specified but each of the first optical section 110 and the second optical section 120 may be substantially made of glass or a resin. Glass is a material having comparatively high transmittance (high transmittance against light of a short wavelength band in particular), good at homogeneity and resistance to climate, and having high hardness. Therefore, when each of the first optical section 110 and the second optical section 120 is substantially made of glass, a composite optical device 101 having high transmittance (high transmittance against light of a short wavelength band in particular), good at resistance to climate and having high hardness and a high optical characteristic can be realized. On the other hand, when each of the first optical section 110 and the second optical section 120 is substantially made of a resin, a composite optical device 101 can be fabricated easily and inexpensively without using high temperature equipment. From the viewpoint of fabrication easiness and fabrication cost, an energy-curing resin is particularly preferably used. Specifically, when an energy-curing resin such as a UV curing resin or an electron beam curing resin is used, it can be cured in a short period of time and hence the productivity can be improved. On the contrary, when a thermosetting resin is used as the material for the second optical section 120, a composite optical device 101 can be obtained easily and inexpensively through a heat treatment without using a large scale system for emitting UV or an electron beam. It is noted that the "energy-curing resin" herein means a resin cured by providing given energy (such as heat, UV or an electron beam (EB)). Specific examples of the energy-curing resin are a thermosetting resin, a UV curing resin and an electron beam (EB) curing resin.

Since glass has a higher softening temperature and higher hardness than a resin in general, in the case where the first optical section 110 is substantially made of glass and the second optical section 120 is substantially made of a resin (such as a thermoplastic resin or an energy-curing resin), deformation and breakage of the first optical section 110 can be suppressed in pressing, as a die, the first optical section 110 made of glass and molded into a desired shape onto a resin in a softened state.

In the case where both of the first optical section 110 and the second optical section 120 are substantially made of resins, since the compositions of the materials for the first optical section 110 and the second optical section 120 are close to each other and their physical properties (such as a thermal expansion coefficient) are close to each other, high adhesiveness can be attained between the first optical section 110 and the second optical section 120, and high resistance to environment such as high resistance to temperature change can be realized.

Alternatively, both of the first optical section 110 and the second optical section 120 may be substantially made of glass. Thus, a composite optical device 101 good at light transmittance and resistance to climate can be particularly realized. In the case where both of the first optical section 110 and the second optical section 120 are substantially made of glass, a material for the first optical section 110 preferably has a higher glass transition temperature and a higher softening temperature than a material for the second optical section 120. More preferably, the second optical section 120 is made of low-melting glass.

Although the smooth part 113 is made of an aspheric surface and the concave-convex part 112 is made of a diffraction surface with a saw-toothed cross-section in Embodiment 3, the smooth part may be, for example, a plane, a spherical surface, a cylindrical surface, an ellipsoidal surface, a toric surface or the like in this invention. Also, the concave-convex part may be, for example, a diffraction surface with a rectangular or a sinusoidal cross-section, a lens array surface including a plurality of concave or convex lens surfaces, a phase step surface or an antireflection surface having an antireflection structure (such as a structure including a plurality of cone-shaped projections or cone-shaped recesses arranged at a pitch not larger than the wavelength of light to be suppressed in the reflection).

Furthermore, the first optical section 110 is not limited to one obtained by the press molding but may be obtained by the etching or injection molding. Also, the second optical section 120 may be formed by applying a resin material on the optical functional surface 111 by an application method such as spin coating or squeezing and curing the applied resin material.

Modification 5

Figure 17:
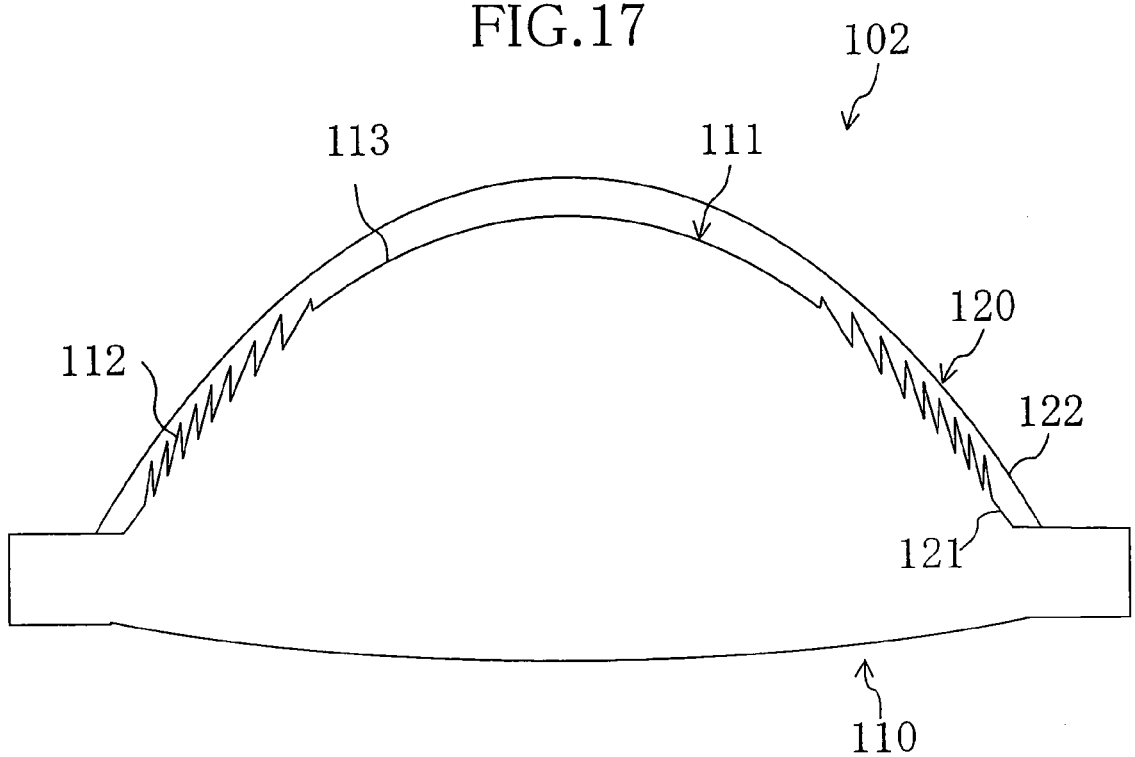
FIG. 17 is a cross-sectional view of a composite optical device 102 according to Modification 5.
Figure 18:
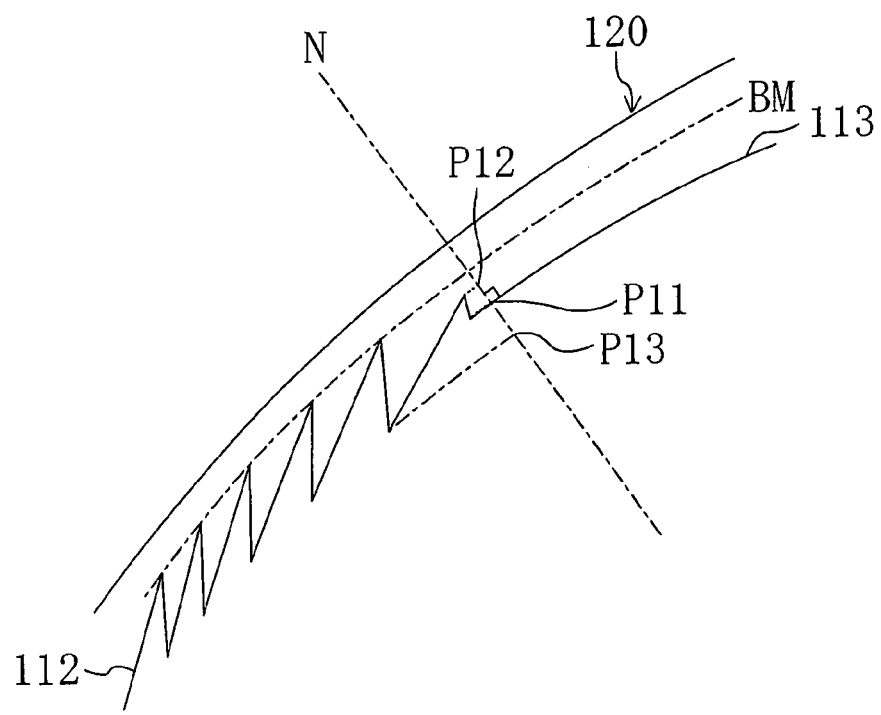
FIG. 18 is an enlarged cross-sectional view of a boundary vicinity portion NR of the composite optical device 102.

FIG. 17 is a cross-sectional view of a composite optical device 102 according to Modification 5. FIG. 18 is an enlarged cross-sectional view of a boundary vicinity portion NR of the composite optical device 102.

In Embodiment 3 described above, the concave-convex part 112 is positioned at the center of the optical functional surface 111 and the smooth part 113 is provided around the concave-convex part 112. Instead, the smooth part 113 may be positioned at the center of the optical functional surface 111 with the concave-convex part 112 provided around the smooth part 113. Such a structural example will be described in this Modification 5. It is noted that the same reference numerals are used to refer to composing elements having substantially the same functions as in Embodiment 3 so as to omit the description.

In Modification 5, an optical functional surface 111 includes a smooth part 113 positioned at the center and a concave-convex part 112 provided around and adjacent to the smooth part 113. In addition, as shown in FIG. 18, the optical functional surface 111 is constructed so that a position P12, along the normal direction N of the smooth part 113, of a convex apex of the concave-convex part 112 can be farther from the center of the first optical section 110 than a position P11 along the normal direction N of an end of the smooth part 113 on a side of the concave-convex part 112 in the boundary vicinity portion NR between the smooth part 113 and the concave-convex part 112. In other words, the concave-convex part 112 is protruded from (is thicker than) the smooth part 113. Therefore, in pressing a resin with the first optical section 110 for forming the second optical section 120, the concave-convex part 112 comes into contact with the resin before the smooth part 113. Accordingly, pressure applied to the resin by the concave-convex part 112 is large and the quantity of pressure applied to the resin by the concave-convex part 112 is large. As a result, substantially no gap is formed between the first optical section 110 and a second optical section 120, resulting in obtaining the composite optical device 102 with high form accuracy.

Also in Modification 5 in the same manner as in Embodiment 3, a distance along the normal direction N between a concave bottom and a convex apex of the concave-convex part 112 (i.e., a distance between positions P2 and P3) in the boundary vicinity portion NR is preferably not more than five times (more preferably twice and specifically 1.5 times) as large as a distance along the normal direction N between the end of the smooth part 113 on the side of the concave-convex part 112 and the concave bottom (i.e., a distance between the positions P1 and P2). Also, the optical functional surface 111 is preferably constructed so that a virtual aspheric surface BM including the convex apexes of the concave-convex part 112 can be farther from the center of the first optical section 110 than the smooth part 113 in the boundary vicinity portion NR. Furthermore, the position P13 along the normal direction N of the concave bottom of the concave-convex part 112 is preferably farther from the center of the first optical section 110 than the position P11 in the boundary vicinity portion NR, and the concave bottoms of the concave-convex part 112 are more preferably farther from the center of the first optical section 110 than a virtual aspheric surface including the position P11 and having the same aspheric coefficient as the virtual aspheric surface BM in the boundary vicinity portion NR.

Embodiment 4

Although the composite optical device using, as the first optical section 110, a biconvex lens having the concave-convex part 112 made of a diffraction surface is described in Embodiment 3 and Modification 5, the concave-convex part is not limited to a diffraction surface in this invention. Also, the first optical section is not limited to a lens such as a biconvex lens. The first optical section may be, for example, a meniscus or biconcave lens, or in a parallel plate shape.

In Embodiment 4, an example of a composite optical device including a first optical section 150 in the parallel plate shape will be described in detail with reference to FIGS. 19 and 20. In the description of Embodiment 4, the same reference numerals are used to refer to composing elements having substantially the same functions as in Embodiment 4 so as to omit the description.

Figure 19:
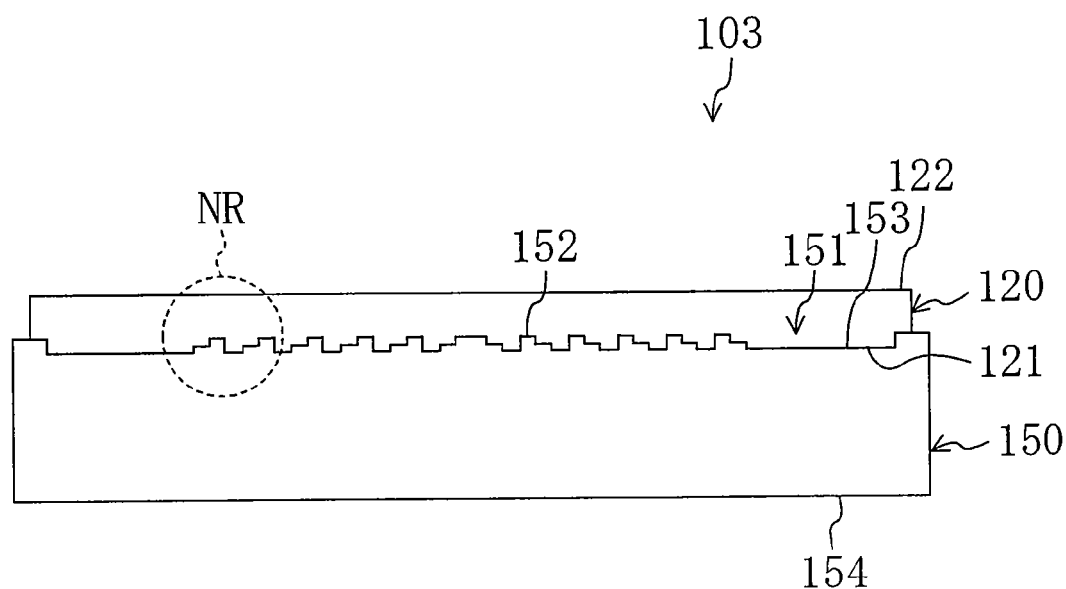
FIG. 19 is a cross-sectional view of a composite optical device 103 according to Embodiment 4.
Figure 20:
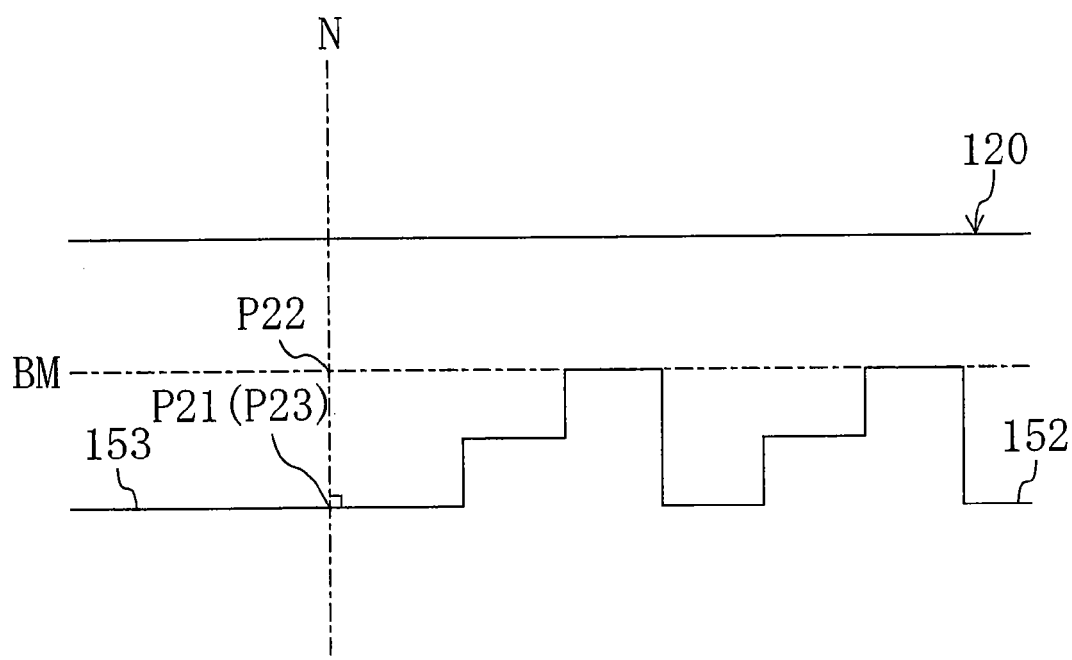
FIG. 20 is an enlarged cross-sectional view of a boundary vicinity portion NR of the composite optical device 103.

FIG. 19 is a cross-sectional view of a composite optical device 103 according to Embodiment 4. FIG. 20 is an enlarged cross-sectional view of a boundary vicinity portion NR of the composite optical device 103.

The composite optical device 103 of Embodiment 4 includes a first optical section 150 and a second optical section 120. The first optical section 150 includes an optical functional surface 154 in a plane shape and an optical functional surface 151 opposing and substantially in parallel to the optical functional surface 154. The optical functional surface 151 includes a concave-convex part 152 provided at the center and a flat smooth part 153 provided around the concave-convex part 152. The second optical section 120 is bonded to the first optical section 150 on the optical functional surface 151, and has an optical functional surface 122 opposing an optical functional surface 121 bonded to the first optical section 150 and formed as a smooth surface substantially in parallel to the optical functional surfaces 151 and 154 of the first optical section 150.

In Embodiment 4, the concave-convex part 152 is formed as what is called a step-shaped diffraction surface in which bevels of respective relieves are formed in a step shape in a cross-sectional view. Therefore, out of substantially parallel beams vertically entering the composite optical device 103, light entering a region of the flat smooth part 153 is not substantially shifted in its phase by the composite optical device 103 but outgoes from the composite optical device 103 as substantially parallel beams. On the other hand, substantially parallel beams entering a region of the concave-convex part 152 formed as the so-called step-shaped diffraction surface outgo from the composite optical device 103 with the phase shifted by the concave-convex part 152. For example, in the concave-convex part 152 in the shape shown in FIG. 19, substantially parallel beams entering the region of the concave-convex part 152 outgo from the composite optical device 103 as collected beams.

Next, the specific shape of the optical functional surface 151 will be described in detail with reference to FIG. 20. The optical functional surface 151 is constructed so that a position P22, along the normal direction N of the flat smooth part 153, of a convex apex of the concave-convex part 152 can be farther from the center of the first optical section 150 than a position P21 along the normal direction N of an end of the flat smooth part 153 on a side of the concave-convex part 152. In other words, the concave-convex part 152 is protruded from (is thicker than) the flat smooth part 153. Therefore, in pressing a resin with the first optical section 150 for forming the second optical section 120, the concave-convex part 152 comes into contact with the resin before the flat smooth part 153. Accordingly, pressure and the quantity of pressure applied to the resin by the concave-convex part 152 are comparatively large. As a result, substantially no gap is formed between the first optical section 150 and the second optical section 120, so as to obtain the composite optical device 103 with high form accuracy.

Also in Modification 5 in the same manner as in Embodiment 3, a distance along the normal direction N between a concave bottom and a convex apex of the concave-convex part 152 (i.e., a distance between positions P22 and P23) in the boundary vicinity portion NR is preferably not more than five times (more preferably twice and specifically 1.5 times) as large as a distance along the normal direction N between the end of the flat smooth part 153 on the side of the concave-convex part 152 and the concave bottom (i.e., a distance between the positions P21 and P22). Also, the optical functional surface 151 is preferably constructed so that a virtual plane BM including the convex apexes of the concave-convex part 152 can be farther from the center of the first optical section 150 than the flat smooth part 153 in the boundary vicinity portion NR. Furthermore, in the boundary vicinity portion NR, the position P23 along the normal direction N of the concave bottom of the concave-convex part 152 is preferably farther from the center of the first optical section 150 than the position P21, and the concave bottoms of the concave-convex part 152 are more preferably farther from the center of the first optical section 150 than a virtual plane including the flat smooth part 153.

Modification 6

Modification 6 is a modification of Embodiment 4 described above. In Modification 6, a concave-convex part made of a lens array surface will be described in detail with reference to FIGS. 21 and 22. In the description of Modification 6, the same reference numerals are used to refer to composing elements having substantially the same functions as in Embodiment 3 or 4 so as to omit the description.

Figure 21:
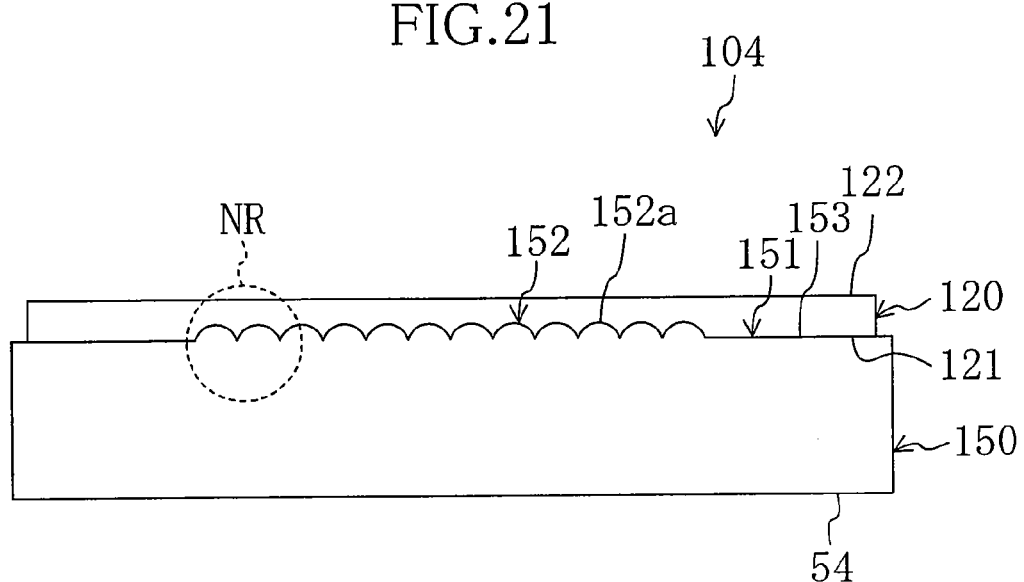
FIG. 21 is a cross-sectional view of a composite optical device 104 according to Modification 6.
Figure 22:
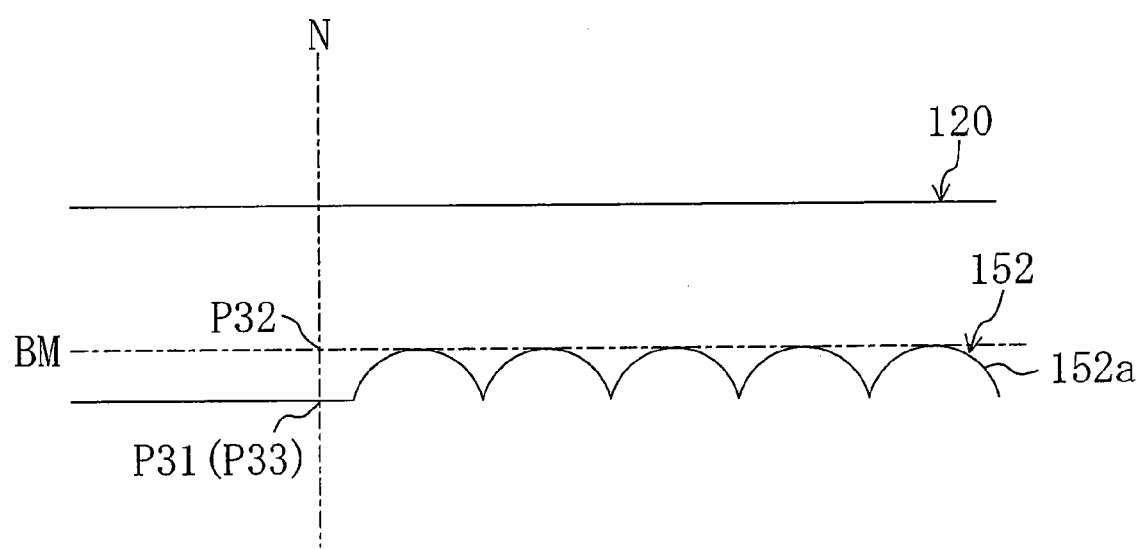
FIG. 22 is an enlarged cross-sectional view of a boundary vicinity portion NR of the composite optical device 104.

FIG. 21 is a cross-sectional view of a composite optical device 104 according to Modification 6. FIG. 22 is an enlarged cross-sectional view of a boundary vicinity portion NR of the composite optical device 104.

In Modification 6, a concave-convex part 152 is formed as a lens array surface (i.e., a surface on which a plurality of concave or convex lens surfaces 152a are arranged). Therefore, out of substantially parallel beams vertically entering the composite optical device 104, light entering a region of a flat smooth part 153 is not substantially shifted in the phase by the composite optical device 104 but outgoes from the composite optical device 104 as substantially parallel beams. On the other hand, substantially parallel beams entering a portion of the concave-convex part 152 formed as the lens array surface outgo from the composite optical device 104 with the phase shifted by the concave-convex part 152.

Next, the specific shape of an optical functional surface 151 will be described in detail with reference to FIG. 22. The optical functional surface 151 is constructed so that a position P32, along the normal direction N of a flat smooth part 153, of a convex apex of the concave-convex part 152 can be farther from the center of a first optical section 150 than a position P31 along the normal direction N of an end of the flat smooth part 153 on a side of the concave-convex part 152 in the boundary vicinity portion NR between the flat smooth part 153 and the concave-convex part 152. In other words, the concave-convex part 152 is protruded from (is thicker than) the flat smooth part 153. Therefore, in pressing a resin with the first optical section 150 for forming a second optical section 120, the concave-convex part 152 comes into contact with the resin before the flat smooth part 153. Accordingly, pressure and the quantity of pressure applied to the resin by the concave-convex part 152 are comparatively large. As a result, substantially no gap is formed between the first optical section 150 and the second optical section 120, so as to obtain the composite optical device 104 with high form accuracy.

Also in Modification 5 in the same manner as in Embodiment 3, a distance along the normal direction N between a concave bottom and a convex apex of the concave-convex part 152 (i.e., a distance between the positions P32 and P33) in the boundary vicinity portion NR is preferably not more than five times (more preferably twice and specifically 1.5 times) as large as a distance along the normal direction N between the end of the flat smooth part 153 on the side of the concave-convex part 152 and the concave bottom (i.e., a distance between the positions P31 and P32). Also, in the boundary vicinity portion NR, a virtual plane BM including the concave bottoms of the concave-convex part 152 is preferably farther from the center of the first optical section 150 than the flat smooth part 153. Furthermore, in the boundary vicinity portion NR, the position P33 along the normal direction N of the concave bottom of the concave-convex part 152 is preferably farther from the center of the first optical section 150 than the position P31, and the concave bottoms of the concave-convex part 152 are more preferably farther from the center of the first optical section 150 than a virtual plane including the flat smooth part 153.

Modification 7

Modification 7 is a further modification of Modification 5. In Modification 7, an example of a concave-convex part made of a phase step surface will be described in detail with reference to FIG. 23. In the description of Modification 7, the same reference numerals are used to refer to composing elements having substantially the same functions as in Embodiment 3 or Modification 5 so as to omit the description. Furthermore, FIG. 17 is also referred to commonly to Modification 5.

Figure 23:
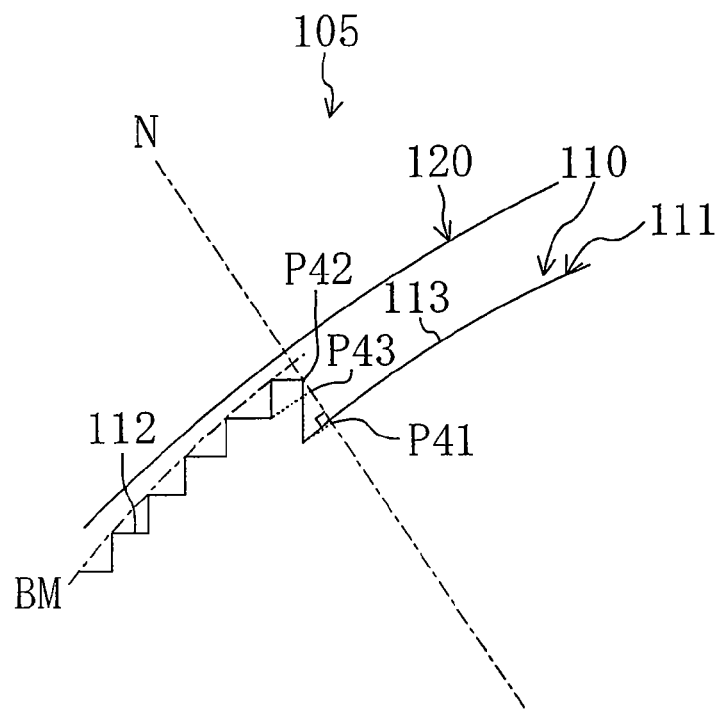
FIG. 23 is an enlarged cross-sectional view of a boundary vicinity portion NR of a composite optical device 105 according to Modification 7.

FIG. 23 is an enlarged cross-sectional view of a boundary vicinity portion NR of a composite optical device 105 according to Modification 7.

In Modification 7, a concave-convex part 112 is made of a phase step surface with a step-shaped cross-section. More specifically, an optical functional surface 111 is constructed so that a position P42, along the normal direction N of a smooth part 113, of a convex apex of the concave-convex part 112 can be farther from the center of a first optical section 110 than a position P41 along the normal direction N of an end of the smooth part 113 on a side of the concave-convex part 112. In other words, the concave-convex part 112 is protruded from (is thicker than) the smooth part 113. Therefore, in pressing a resin with the first optical section 110 for forming a second optical section 120, the concave-convex part 112 comes into contact with the resin before the flat smooth part 113. Accordingly, pressure and the quantity of pressure applied to the resin by the concave-convex part 112 are comparatively large. As a result, substantially no gap is formed between the first optical section 110 and the second optical section 120, so as to obtain the composite optical device 105 with high form accuracy.

Also in Modification 7 in the same manner as in Embodiment 3, a distance along the normal direction N between a concave bottom and a convex apex of the concave-convex part 112 (i.e., a distance between positions P42 and P43) in the boundary vicinity portion NR is preferably not more than five times (more preferably twice and specifically 1.5 times) as large as a distance along the normal direction N between the end of the flat smooth part 113 on the side of the concave-convex part 112 and the concave bottom (i.e., a distance between the positions P41 and P42). Also, in the boundary vicinity portion NR, a virtual aspheric surface BM including the convex apexes of the concave-convex part 112 is preferably farther from the center of the first optical section 110 than the flat smooth part 113. Furthermore, in the boundary vicinity portion NR, the position P43 along the normal direction N of the concave bottom of the concave-convex part 112 is preferably farther from the center of the first optical section 110 than the position P41, and the concave bottoms of the concave-convex part 112 are more preferably farther from the center of the first optical section 110 than a virtual plane including the position P41 and having the same aspheric coefficient as the virtual aspheric surface BM.

Modification 8

Modification 8 is a further modification of Embodiment 4. In Modification 8, an example of a concave-convex part made of an antireflection surface having an antireflection structure will be described in detail with reference to FIG. 24. In the description of Modification 8, the same reference numerals are used to refer to composing elements having substantially the same functions as in Embodiment 3 or 4 so as to omit the description. Furthermore, FIG. 19 is also referred to commonly to Embodiment 4.

Figure 24:
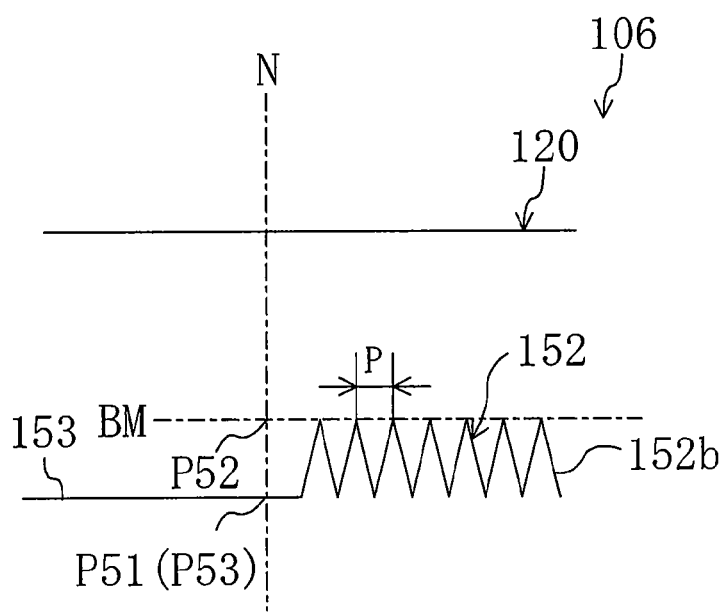
FIG. 24 is an enlarged cross-sectional view of a boundary vicinity portion NR of a composite optical device 106 according to Modification 8.

FIG. 24 is an enlarged cross-sectional view of a boundary vicinity portion NR of a composite optical device 106 of Modification 8.

In Modification 8, a concave-convex part 152 is formed as an antireflection surface having an antireflection structure in which a plurality of cone-shaped projections 152b are arranged at a pitch P not larger than the wavelength of light to be reflected. Therefore, out of substantially parallel beams vertically entering the composite optical device 106, light entering a region of the concave-convex part 152 is suppressed in the reflection by the concave-convex part 152, and hence transmits at comparatively high transmittance as compared with in a region of a high flat smooth part 153 so as to outgo from the composite optical device 106.

As shown in FIG. 24, the optical functional surface 151 is constructed so that a position P52, along the normal direction N of the flat smooth part 153, of a convex apex of the concave-convex part 152 can be farther from the center of a first optical center 150 than a position P51 along the normal direction N of an end of the flat smooth part 153 on a side of the concave-convex part 152. In other words, the concave-convex part 152 is protruded from (is thicker than) the flat smooth part 153. Therefore, in pressing a resin with the first optical section 150 for forming a second optical section 120, the concave-convex part 152 comes into contact with the resin before the flat smooth part 153. Accordingly, pressure and the quantity of pressure applied to the resin by the concave-convex part 152 are comparatively large. As a result, substantially no gap is formed between the first optical section 150 and the second optical section 120, so as to obtain the composite optical device 106 with high form accuracy.

Also in Modification 8 in the same manner as in Embodiment 3, a distance along the normal direction N between a concave bottom and a convex apex of the concave-convex part 152 (i.e., a distance between positions P52 and P53) in the boundary vicinity portion NR is preferably not more than five times (more preferably twice and specifically 1.5 times) as large as a distance along the normal direction N between the end of the flat smooth part 153 on the side of the concave-convex part 152 and the concave bottom (i.e., a distance between the positions P51 and P52). Also, the optical functional surface 151 is preferably constructed so that a virtual plane BM including the convex apexes of the concave-convex part 152 can be farther from the center of the first optical section 150 than the flat smooth part 153 in the boundary vicinity portion NR. Furthermore, in the boundary vicinity portion NR, the position P53 along the normal direction N of the concave bottom of the concave-convex part 152 is preferably farther from the center of the first optical section 150 than the position P51, and the concave bottoms of the con-cave-convex part 152 are more preferably farther from the center of the first optical section 150 than a virtual plane including the flat smooth part 153.

INDUSTRIAL APPLICABILITY

Since the composite optical device according to the present invention can be easily fabricated with high form accuracy, it is useful for optical equipment, and is particularly useful for an optical pickup, a camera device (such as a digital still camera or a digital video camera), a display device (such as a projector) and the like.

The invention claimed is:

1. A composite optical device comprising:
a first optical section having an optical functional surface; and
a second optical section bonded to said first optical section on said optical functional surface,
wherein said optical functional surface includes a smooth part and a concave-convex part adjacent to each other, and
said optical functional surface is constructed in such a manner that a position, along a normal direction of said smooth part, of a concave bottom of said concave-convex part is closer to a center of said first optical section than a position along the normal direction of an end of said smooth part on a side of said concave-convex part in the vicinity of a boundary between said smooth part and said concave-convex part.

2. The composite optical device of claim 1,
wherein said first optical section is obtained by press molding.

3. The composite optical device of claim 1,
wherein said second optical section is a lens in which a surface bonded to said first optical section is one lens surface and another lens surface opposing said one lens surface is formed as a smooth surface.

4. The composite optical device of claim 1,
wherein each of said first optical section and said second optical section is substantially made of glass or a resin.

5. The composite optical device of claim 1,
wherein said concave-convex part is a diffraction surface, a lens array surface including a plurality of convex or concave lens surfaces, a phase step surface or an antireflection surface having an antireflection structure.

6. The composite optical device of claim 1,
wherein said optical functional surface is constructed in such a manner that a distance along the normal direction between a concave bottom and a convex apex of said concave-convex part is not less than ⅕ times as large as a distance between the end of said smooth part on the side of said concave-convex part and said concave bottom in the vicinity of the boundary.

7. A composite optical device comprising:
a first optical section having an optical functional surface; and
a second optical section bonded to said first optical section on said optical functional surface,
wherein said optical functional surface includes a smooth part and a concave-convex part adjacent to each other, and
said optical functional surface is constructed in such a manner that a position, along a normal direction of said smooth part, of a convex apex of said smooth part is farther from a center of said first optical section than a position along the normal direction of an end of said smooth part on a side of said concave-convex part in the vicinity of a boundary between said smooth part and said concave-convex part.

8. The composite optical device of claim 7,
wherein said second optical section is pressingly bonded to said first optical section.

9. The composite optical device of claim 7,
wherein each of said first optical section and said second optical section is substantially made of glass or a resin.

10. The composite optical device of claim 7,
wherein said concave-convex part is a diffraction surface, a lens array surface including a plurality of convex or concave lens surfaces, a phase step surface or an antireflection surface having an antireflection structure.

11. The composite optical device of claim 7,
wherein said optical functional surface is constructed in such a manner that a distance along the normal direction between a concave bottom and a convex apex of said concave-convex part is not more than five times as large as a distance between the end of said smooth part on the side of said concave-convex part and said convex apex in the vicinity of the boundary.

* * * * *